United States Patent
Luckow et al.

(10) Patent No.: US 12,363,168 B1
(45) Date of Patent: Jul. 15, 2025

(54) CONDITIONAL ACCESS CONTROL POLICY FINDING GENERATION

(71) Applicant: Amazon Technologies, Inc., Seattle, WA (US)

(72) Inventors: Kasper Søe Luckow, Sunnyvale, CA (US); Daniel George Peebles, Richland, WA (US); Andrew Jude Gacek, Maple Grove, MN (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 18/208,577

(22) Filed: Jun. 12, 2023

(51) Int. Cl.
*H04L 9/40* (2022.01)

(52) U.S. Cl.
CPC .......... *H04L 63/20* (2013.01); *H04L 63/0435* (2013.01); *H04L 63/101* (2013.01)

(58) Field of Classification Search
CPC .... H04L 63/20; H04L 63/0435; H04L 63/101
See application file for complete search history.

(56) References Cited

U.S. PATENT DOCUMENTS

| | | | |
|---|---|---|---|
| 10,757,128 B2 * | 8/2020 | Cook | H04L 41/22 |
| 11,165,783 B1 * | 11/2021 | Eiers | H04L 67/01 |
| 11,483,317 B1 * | 10/2022 | Bolignano | G06F 21/577 |
| 11,616,800 B2 * | 3/2023 | Cook | H04L 63/1433 726/1 |
| 11,736,525 B1 * | 8/2023 | Rungta | G06F 21/604 726/1 |
| 2005/0166167 A1 * | 7/2005 | Ivancic | G06F 11/3608 703/22 |
| 2019/0007418 A1 * | 1/2019 | Cook | H04N 21/443 |
| 2019/0007443 A1 * | 1/2019 | Cook | G06F 21/55 |
| 2020/0366707 A1 * | 11/2020 | Cook | H04L 41/0894 |
| 2022/0191205 A1 * | 6/2022 | Cook | H04L 41/0627 |
| 2022/0191206 A1 * | 6/2022 | Cook | H04L 41/0627 |

OTHER PUBLICATIONS

Backes, et al., "Semantic-based Automated Reasoning for AWS Access Policies using SMT", Formal Methods in Computer Aided Design (FMCAD), 2018, 9 pages.
Backes, et al., "Stratified Abstraction of Access Control Policies", CAV 2020, International Conference on Computer Aided Verification, 2020, pp. 1-11.
Barrett, et al., "CVC4", International Conference on Computer Aided Verification, 2011, pp. 171-177.
De Moura, et al., "Z3: An Efficient SMT Solver", International Conference on Tools and Algorithms for the Construction and Analysis of Systems, 2008, pp. 337-340.

* cited by examiner

*Primary Examiner* — Yonas A Bayou
(74) *Attorney, Agent, or Firm* — Nicholson DeVos Webster & Elliott LLP

(57) ABSTRACT

Techniques for more precise access control policy findings, use a conditional injection of policy constraints into a findings analysis. The injection of a policy constraint of a policy being analyzed into the findings analysis is conditioned on the policy itself. In particular, the injection is conditioned on whether the policy constraint is trusted in the context of the policy (e.g., unlikely to be spoofed or manipulated in the policy context). As a result, where a policy constraint can be trusted in the context of a given policy, a more precise (e.g., more specific) findings analysis of the policy based on the policy constraint can be conducted than if the policy constraint were not included in the policy finding analysis (e.g., because the policy constraint is not trusted in other policy contexts).

20 Claims, 12 Drawing Sheets

```
IMPRECISE FINDING 300

{
    "ACTION": "WRITE",
    "ISPUBLIC": FALSE,
    "PRINCIPAL": "LOGGING SERVICE",
    "RESOURCE": "MY-RESOURCE",
    "CONDITION": {}
}
```

PRECISE FINDING 400

```
{
    "ACTION": "WRITE",
    "ISPUBLIC": FALSE,
    "PRINCIPAL": "LOGGING SERVICE",
    "RESOURCE": "MY-RESOURCE",
    "CONDITION": {
        "STRINGEQUALS": {
            "SOURCEACCT": "111122223333"
        }
    }
}
```

*FIG. 4*

ACCESS ANALYZER

*ACCCOUNT: 222333444*

& USER: USER1    COMPANY-X

| ACTIVE | ARCHIVED | RESOLVED | ALL |

ACTIVE FINDINGS

| FINDING ID | RESOURCE | EXTERNAL PRINCIPAL | POLICY CONSTRAINT |
|---|---|---|---|
| ABC | MY-FIRST-RESOURCE | LOGGING SERVICE | RESOURCE PATH = 111222333 CONFUSED DEPUTY PROTECTION |
| DEF | MY-SECOND-RESOURCE | EMAIL SERVICE | REFERER = 666777888 CONFUSED DEPUTY PROTECTION |
| GHI | MY-THIRD-RESOURCE | ALL | NO CONFUSED DEPUTY PROTECTION |

*FIG. 10*

CONDITIONAL ACCESS CONTROL POLICY FINDING GENERATION

TECHNICAL FIELD

The present disclosure relates to the technical field of information security, and more particularly, to computer-implemented authorization systems and methods for controlling access to information and data.

BACKGROUND

Today, cloud computing platforms offer a wide range of infrastructure services, such as computing power, storage options, and networking solutions. These platforms enable customers to host their applications and data in the cloud, allowing them to scale resources up or down as needed, pay only for what they use, and avoid the upfront costs and complexity of building and maintaining their own physical and application infrastructure. Additionally, these platforms offer various application infrastructure services, including virtual server services, application container services, serverless computing services, cloud data storage services, networking and connectivity services, database services, machine learning services, and data analytic services, among others.

As the physical and application infrastructure is shared among many customers, cloud computing platforms may also provide access management services. These services help customers securely control access to the resources allocated to them on the platform. By utilizing an access management service, customers can centrally define and manage permissions that determine "who has access to what."

A challenge faced by customers using access management services is defining permissions that grant the minimum necessary access to their resources for performing assigned tasks or functions. This principle is commonly referred to as the "principle of least privilege" or "least privileged access." By adhering to the principle of least privilege, customers can reduce the risk of unauthorized data breaches and other security incidents. This approach ensures that customers, users, and services have access only to the resources required for their specific roles or responsibilities, minimizing the potential for accidental or intentional misuse of resources. However, the challenge for customers lies in determining whether a set of customer-defined permissions aligns with the principle of least privilege.

BRIEF DESCRIPTION OF DRAWINGS

Embodiments and various aspects of the present disclosure are illustrated in the following detailed description and the accompanying figures. The features shown in the figures are not drawn to scale.

FIG. 4 presents an example of a precise finding for the example policy of FIG. 2, according to some embodiments.

FIG. 10 illustrates an example user interface presenting findings by a conditional access analyzer, according to some embodiments.

DETAILED DESCRIPTION

Figure 1:
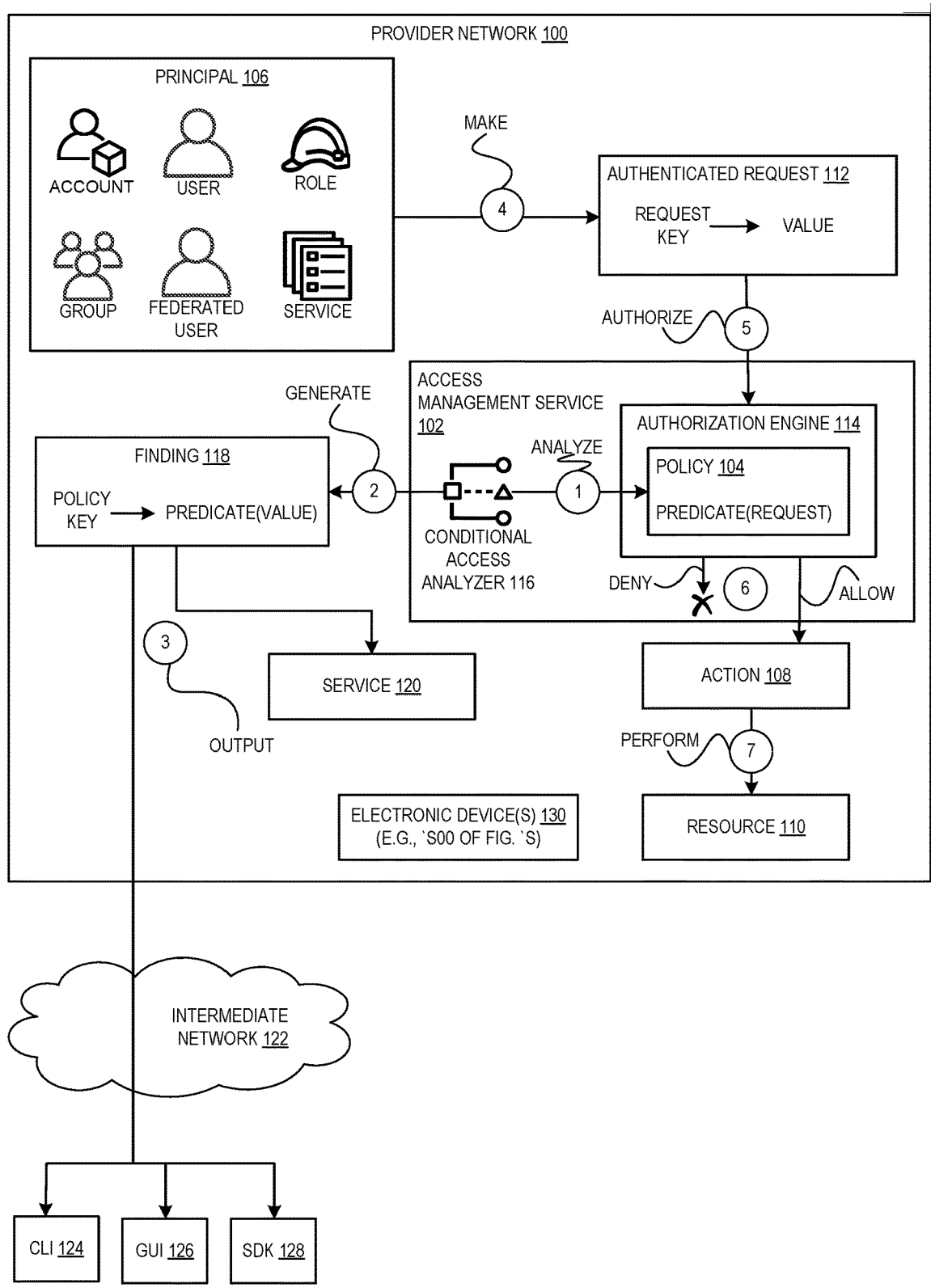
FIG. 1 depicts an example of a provider network environment in which techniques for generating conditional access control policy findings are implemented, according to some embodiments.

The present disclosure relates to methods, systems, and non-transitory computer-readable storage media (collectively, "techniques") for conditional access control policy finding generation.

The precision of findings by an access analysis tool (access analyzer) can be vitally important to the usefulness of such a tool. An imprecise finding (e.g., a false positive) can mislead customers into believing that their resources are not adequately protected by their policies (e.g., overly permissive). So, precision in findings is needed.

Techniques herein provide more precise findings by using a conditional injection of policy constraints into a findings analysis. A "policy constraint" may refer to a key-value pair of an access control policy ("policy") that defines a condition on the effect of the policy. For example, a policy constraint may condition access to a resource based on the source network address of the requester being a specified network address or within a specified range of network addresses. A finding identifies access allowed by a policy, as determined by the findings analysis of the policy. The injection of a policy constraint of a policy being analyzed into the findings analysis is conditioned on the policy itself. Specifically, the injection is conditioned on whether the policy constraint is trusted in the context of the policy (e.g., unlikely to be spoofed or manipulated in the policy context). As a result, when a policy constraint can be trusted in the context of a given policy, a more precise (e.g., more specific) findings analysis of the policy based on the policy constraint can be conducted compared to if the policy constraint were not included in the policy finding analysis (e.g., because the policy constraint is not trusted in other policy contexts).

As an example of the problem addressed herein, let's consider the access of a provider network resource by a service within the provider network. For instance, a logging service may be configured to store audit log data on behalf of a first customer account in a specific data storage service data container provisioned to a second customer account. In this scenario, the first customer account has indirect access to the second customer account's specific data container through the logging service. The customer holding the second customer account may wish to protect the particular data storage container from confused deputy access by the logging service. For example, the customer holding the second customer account may want to ensure that the logging service can only store audit log data in the particular data container on behalf of the first customer account and not for any other customer accounts.

To achieve this, the customer holding the second customer account can configure a policy to protect access to the particular data container. For instance, the policy may allow writes to the specific data container only when the write request is made by the logging service and on behalf of the first customer account. All other requests to write data to the particular data container would be denied by the policy.

An access analysis tool (access analyzer) that analyzes such a policy should confirm the presence of confused deputy protection by generating a finding that allows writes of data to the particular data container only when requested by the logging service on behalf of the first customer account. If the access analyzer fails to generate such a finding, the customer of the second customer account may mistakenly believe that confused deputy protection is not in place. Conversely, if the customer of the second customer account neglected to configure such a policy, the access analyzer should generate a finding that indicates the level of accessibility of the particular data container by entities other than the logging service acting on behalf of the first customer account. For example, if the particular data container is publicly accessible, the finding should reflect that. The techniques disclosed herein can be employed by an access analyzer to generate such findings.

More subtly, the access analyzer may generate an imprecise finding. For instance, based on the policy, the access analyzer may determine that the logging service has permission to write data to the particular data container and produce a corresponding finding. Although the finding is technically true, it lacks precision. According to the policy, the logging service is only allowed to write data to the particular data container when performing the write operation on behalf of the first user account. Consequently, a finding that simply states that the logging service can write data to the particular data container falsely suggests that the policy does not offer confused deputy protection for the specific data container.

To address this, the policy analyzer should generate a more precise finding that explicitly indicates the logging service's capability to write data to the particular data container solely when acting on behalf of the first customer account. The techniques disclosed herein can be employed by a policy analyzer to produce such accurate findings.

As mentioned, the techniques disclosed herein can be utilized to generate more precise findings for policies intended to offer confused deputy protection. The term "confused deputy" generally refers to a scenario where a computer program, process, or service (referred to as the "deputy") is deceived, manipulated, or unintentionally configured by a user or another program, process, or service into performing an action or operation that it was not originally authorized to execute.

Returning to the previous example where a logging service is configured to store audit log data on behalf of a first customer account in a specific data storage service data container provisioned to a second customer account, a policy protecting the data container may grant the logging service permission to write data to the container. In this case, the logging service can write data to the data container on behalf of the first customer account. However, if the policy fails to restrict writes to the data container by the logging service to only those made on behalf of the first customer account, then the policy does not prevent the logging service from writing data to the container on behalf of a different customer account when it is deceived, manipulated, or unintentionally configured to do so. Consequently, the policy in this case does not provide confused deputy protection.

Since the techniques can generate more precise findings for a policy designed to offer confused deputy protection, they also generate more precise findings in cases where a policy should provide confused deputy protection but fails to do so. For instance, consider a scenario where the policy governing access to the data container of the second customer account permits writes by the logging service only when performed on behalf of the first customer account. In this case, a first finding generated using the disclosed techniques may accurately indicate to the user that the policy provides confused deputy protection. On the other hand, if the policy only allows writes by the logging service without any additional restrictions, a second finding produced using the disclosed techniques may correctly inform the user that the policy lacks confused deputy protection.

Importantly, since a system implementing the disclosed techniques can generate the first type of finding with precision (i.e., without false positives), the user can trust that the second type of finding is also accurate (i.e., not a false positive). This allows the user to take appropriate action, such as modifying the policy to establish confused deputy protection.

FIG. 1 depicts an example of a provider network environment in which techniques for generating conditional access control policy findings are implemented, according to some embodiments. The purpose of illustrating the principles and concepts underlying the techniques is the sole intention of providing the example in FIG. 1. However, the techniques are not limited to any specific type of provider network environment. For instance, the techniques can be implemented in a federated provider network environment involving collaboration among multiple cloud service providers to offer a unified set of services to customers. In such a scenario, a centralized service operated by a third-party could provide access management capabilities to the multiple provider networks and their customers. The disclosed techniques could be employed by the third party to provide the centralized access management capabilities to the multiple provider networks and their customers.

Provider network 100 encompasses the infrastructure established by a cloud service provider to deliver cloud services to customers. Provider network 100 may encompass the underlying network that enables communication and data transfer between the cloud service provider's data centers, the internet, and the customer's systems. The cloud service provider may operate multiple data centers in different geographical regions. Each of these data centers may house the computing infrastructure, including servers, storage systems, and network equipment, that forms the foundation of the cloud services.

Provider network 100 may encompass a network infrastructure within and between data centers. The network infrastructure may encompass routers, switches, firewalls, load balancers, and other networking devices that enable the transmission of data and ensure the availability and performance of cloud services. Provider network 100 may be responsible for connecting data centers to the internet or other networks by establishing high-speed internet connections, peering agreements with internet service providers (ISPs), and direct connection with other cloud providers or private network, such as virtual private networks (VPNs) or dedicated connections.

Provider network 100 may offer virtual network capabilities to customers to create their own virtual networks within the cloud environment, such as by defining subsets, configuring network security policies, and connecting virtual machines or other cloud resources using private network address. Provider network 100 may offer additional network services that customers can utilize to enhance their cloud deployments, such as loading balancing, content delivery networks (CDNs), domain name system (DNS) management, virtual private networks (VPNs), and distributed denial of service (DDoS) protection.

Provider network 100 also offers application services to its customers. The application services may encompass tools, frameworks, and runtime environments that abstract the underlying infrastructure, allowing the customers to focus on coding and application logic. An "application service," or just "service," is a specific offering or functionality provided by provider network 100. Each such service encompasses an application programming interface (APIs), tools, and infrastructure for enabling customers to leverage the service for their particular cloud application.

Some possible application services that might be available to customers of provider network 100 include an elastic computing service, a data storage service, a relational database service, a virtual private cloud service, a notification service, and a serverless computing service.

The elastic computing service provides virtual servers in provider network 100 that enable customers to launch and manage virtual machines for various computing workloads.

The data storage service is a highly scalable and durable data object storage service that allows customers to store and retrieve large amounts of data in the cloud.

The relational database service is a managed database service that supports various relational database engines, such as a Structured Query Language (SQL)-based relational database engine.

The virtual private cloud service enables customers to create isolated virtual networks within provider network 100 and control network settings, IP addressing, and security.

The notification service is a fully managed messaging service that enables the publishing and delivery of messages to various subscribers or endpoints, such as email, short message service (SMS), or mobile push notifications.

The serverless computing service allows customers to run software code without themselves having to provision or manage the servers that execute the code. Instead, the serverless computing service can scale code execution on demand.

These are just some examples of possible services that may be offered by provider network 100 to customers.

Regardless of the set of services offered by provider network 100, customers use resources provided by the services to build and implement their applications.

In the context of information access control, a "resource" is an entity within the environment of provider network 100 that can be assigned permissions and accessed by users, roles, or groups. For example, a resource could be a compute resource, a data storage resource, a networking resource, a database resource, or an application resource.

For instance, a resource could be any of a virtual machine instance, a serverless computing function, a container instance, a batch job, a data storage container, a data storage volume, a database, a columnar storage-based data warehousing cluster, a virtual private cloud, a subset, a security group, a network interface, a database table, a database instance, or any other suitable resource.

One of the services offered in provider network 100 is the access management service 102. Customers of provider network 100 utilize the access management service 102 to manage permissions for accessing their resources within the network. This is achieved through the definition of policies. Different customers may define distinct policies with varying permissions based on their specific application requirements, the resources and services they utilize within provider network 100, and the users, groups, or roles that require access to their resources.

An access control policy, represented generically in FIG. 1 by policy 104, can be defined by a customer of provider network 100. Policy 104 specifies various definitional elements, which may include:

A principal, represented generically in FIG. 1 as principal 106.

An effect, such as allow or deny.

An action, represented generically in FIG. 1 as action 108.

A resource, represented generically in FIG. 1 as resource 110.

One or more conditions.

Any other suitable definitional element.

Policy 104 and its definitional elements are specified in a lightweight data interchange format or another suitable data format used for storing and transmitting structured data. For example, the format may be JavaScript Object Notation (JSON), extensible Markup Language (XML), YAML, MessagePack, Protocol Buffers, Binary JSON (BSON), or any other appropriate data format.

The principal of policy 104 specifies one or more authenticated identities to which the policy applies. In FIG. 1, the principal of policy 104 is represented generically as principal 106. Principal 106 can include a customer account, a user, a role, a group, a federated user, or a service. An identifier is used to specify the principal within the policy. The form of the identifier can vary depending on the type of principal being referenced.

For example, in the case of a customer account, the identifier can be a customer account identifier. When referring to a user within a customer account, the identifier can be a combination of a username and the customer account identifier. Similarly, for a role within a customer account, the identifier can be a combination of a role name and the customer account identifier. A group within a customer account can be identified by a combination of a group name and the customer account identifier. In the case of a federated user, the identifier can be a combination of an external identity provider identifier and the username of the federated user. When referencing a service, the identifier may encompass an identifier specific to the service.

In the context of principal 106, the customer account refers to an account held by a customer of provider network 100. It is associated with resources, users, roles, groups, or policies that are managed by the customer and are considered to be "in" the account. A customer account serves as the customer's unique identity within provider network 100. It is assigned a unique identifier, such as a 12-digit number, which distinguishes it from other accounts within the network. A customer account is typically linked to a billing relationship, enabling the customer to pay for the services consumed within that account.

Customer accounts can exist within a hierarchical structure. A customer may have a primary customer account, acting as the parent account, and can create and manage child customer accounts. This hierarchical structure helps the customer in managing and governing resources across multiple accounts. Each customer account has its own set of access management controls. The customer can create and manage users, groups, roles, and policies within the account to control access and actions on resources.

Resources provisioned within a customer account are logically and operationally isolated by provider network 100 from resources in other accounts. This isolation provides separation, allowing different projects, teams, or organizations to operate independently within their respective accounts. Services utilized within a customer account may incur costs based on usage, and each customer account is billed separately for the services and resources consumed within it. Billing information, including usage and costs, is associated with each customer account.

Provider network 100 implements various security measures and compliance certifications to ensure the security and privacy of customer data within customer accounts. Customer account owners have the ability to configure and manage security settings and implement additional security measures as required.

Within a customer account, services and tools offered by provider network 100 can be accessed and utilized. These services cover various areas, including compute, storage, databases, networking, analytics, machine learning, security, and more.

In summary, a customer account allows customers to access and utilize services within a dedicated and isolated environment within provider network 100. Each customer account operates independently with its own set of resources, permissions, and billing. This arrangement provides customers with flexibility, scalability, and control over their cloud infrastructure and services.

In the context of principal 106, a user represents an individual or application that interacts with services within provider network 100. A user is typically associated with a unique name and a set of credentials. The credentials can take the form of a username/password combination, used for web-console access to resources, or access keys, consisting of an access key identifier and a secret access key, for programmatic access to resources.

A user can be assigned specific permissions through a policy. A policy defines which actions are allowed or denied on particular resources. By assigning appropriate policies, a customer can effectively control and restrict the actions that a user can perform within a customer account.

A user may access services and resources within provider network through a web-based interface or programmatically using various interfaces provided by provider network 100. This includes command-line interfaces, software development kits, or application programming interfaces (APIs) offered by provider network 100. These interfaces enable users to interact with the services and resources programmatically, allowing for automation and integration with other systems and applications.

In the context of principal 106, a role is an identity with a specific set of permissions that can be assumed by users, services, or federated users. Roles are used to grant temporary access to perform specific tasks or access resources within provider network 100. By assuming a role, trusted entities are provided with temporary security credentials. This eliminates the need for long-term access keys and allows customers to grant permissions on a temporary basis.

Various entities can assume a role, including users within the same customer account, users from other customer accounts (cross-account access), services, and federated users from external identity providers. By assigning permissions to a role, customers can delegate access to resources without sharing long-term credentials. This approach enhances security and enables more effective access control management.

A role is associated with a policy that defines the actions that are allowed or denied on specific resources. These policies are similar to those assigned to users, providing granular control over permissions. A role may also have a trust relationship defined, specifying the entities that are allowed to assume the role. The trust relationship determines the principal entities that are trusted to assume the role.

A role can enable a customer to grant access to a resource within one customer account to a user in another customer account. This can be useful in scenarios where resources are shared or when allowing a third-party to manage a resource on the customer's behalf. By leveraging roles, customers can achieve secure resource sharing and effective collaboration across multiple customer accounts within provider network 100. A user with appropriate permission may be able to switch to assume a role temporarily. This is referred to as role switching and can be done programmatically using a command line interface, a software development kit, an application programming interface, or a web console. Overall, a role provides a flexible and secure way to manage access to resources in provider network 100. A role helps enforce the principle of least privilege by allowing users, services, or federated users to assume a role only when needed, reducing the exposure of long-term credentials and minimizing the attack surface.

In the context of principal 106, a group represents a collection of users. It provides a convenient way to manage and assign permissions to multiple users simultaneously, simplifying access control within a customer account. By using groups, a customer can logically organize users and assign permissions to the group instead of individual users. This allows multiple users to inherit those permissions by being members of the group.

A group may be associated with a policy that defines the permissions for the group. By assigning the policy to the group, all users within the group inherit those permissions. Managing and updating permissions for multiple users becomes easier with the use of groups. Users can be dynamically added to or removed from a group, making it convenient to manage access control as users join or leave the organization or change roles. Additionally, a user can be a member of multiple groups simultaneously.

A group can be granted permission to access specific resources or perform certain actions. These permissions are defined using a policy that specifies the allowed or denied actions on specific resources. When a user is a member of multiple groups, they may inherit the combined permissions of all the groups they belong to. However, if a user is explicitly assigned individual permissions, those permissions take precedence over the group permissions.

Modifying the permissions for a group automatically applies the changes to all users within the group. This simplifies permission management and ensures consistency across multiple users. Overall, groups provide a convenient way to manage permissions for multiple users within a customer account. By organizing users into groups and assigning permissions to those groups, customers can efficiently control and manage access to resources while maintaining flexibility and scalability.

In the context of principal 106, a federated user refers to a user who accesses resources within provider network 100 through an external identity provider using federated access. Instead of being directly managed by the access management service 102 within provider network 100, a federated user authenticates with an external identity provider. This identity provider then issues temporary security credentials to the federated user, allowing them to access resources within provider network 100.

Various external identity providers can be used for federated access, such as ACTIVE DIRECTORY FEDERATION SERVICES (AD FS), OKTA, AZURE ACTIVE DIRECTORY, ONELOGIN, or other providers that support standards for exchanging authentication and authorization data between themselves and provider network 100. Examples of such standards include the Security Assertion Markup Language (SAML) or similar protocols.

By leveraging federated access, users can use their existing credentials from an external identity provider to authenticate and gain access to resources within provider network 100. This allows for streamlined access management and simplifies the authentication process for federated users.

In the context of principal 106, a service represents a service within provider network 100 or an application that needs to interact with other services within provider network 100. A service can be granted or denied permission, defined by policy 104, to perform action 108 on resource 110.

To perform its intended tasks on behalf of a customer account, a service may assume a role, which allows it to obtain temporary credentials. These credentials are then used by the service to authenticate and authorize itself as it performs action 108 on resource 110.

For example, a virtual server service within provider network 100 may launch virtual machine instances on behalf of a customer account. Similarly, a serverless execution service within provider network 100 may execute serverless functions on behalf of a customer account, with these functions performing actions on other services within provider network 100.

Certain services within provider network 100 may have built-in or inherent "service" principals that represent the service itself. These services can be granted or denied permissions directly through policy 104. In this case, the service is specified as the principal 106, either in addition to or instead of specifying a role that the service assumes.

The effect of policy 104 is to define permissions and access controls for resource 110. It enables customers to manage and control who can perform action 108 on the resource. Policy 104 is attached to principal 106, specifying an effect that can be either "Allow" or "Deny". Optionally, policy 104 may include one or more policy constraints that must be satisfied for the policy to take effect.

The effect of policy 104 determines whether the specified permissions are granted or denied to principal 106. When principal 106 makes an authenticated request 112 to perform action 108 on resource 110, the authentication engine 114 within access management service 102 evaluates the policy attached to the principal. This evaluation determines whether the requested action is allowed or denied based on policy 104. Policy 104 can be viewed as a predicate on the authenticated request 112. The evaluation of this predicate by the authorization engine 114 results in an "Allow" or "Deny" decision.

By default, the authorization engine 114 denies an authenticated request 112 according to the principle of least privileged access. If policy 104 has an "Allow" effect and the requested action matches the defined permissions and policy constraints, access is granted. Conversely, if policy 104 has a "Deny" effect and the requested action matches the defined permissions and policy constraints, access is explicitly denied. This denial overrides any other policies that might otherwise allow the requested action.

By effectively utilizing policies, customers can enforce the principle of least privilege. This ensures that users and services have only the necessary permissions to perform their intended tasks, thus maintaining the security and integrity of the customer's resources within provider network 100.

Action 108 refers to a specific set of one or more operations on resource 110 that are allowed or denied by policy 104. It defines the granularity of permissions within the policy, enabling customers to precisely specify which operations are permitted or prohibited for resource 110.

In some embodiments, in policy 104, action 108 is represented by a server-specific action name. Each service may have its own set of actions that can be performed on its resources. For example, action 108 specified in policy 104 may take the form of '<service_name>: <operation>'. Here, '<service_name>' identifies the service, and '<operation>' represents the specific action.

For instance, in the case of a data storage service named 'dds', policy 104 might specify 'dds:getObject' as the action to allow or deny the retrieval of a data object. Similarly, in a virtual server service named 'vss', policy 104 could specify 'vss:runInstance' to control the launch of a virtual machine instance.

Furthermore, in a database service named 'dbs', policy 104 might define 'dbs:putItem' as the action to allow or deny the insertion of an item into a database table. Likewise, in a serverless computing service named 'scs', policy 104 could indicate 'scs:invokeFunction' to manage the invocation of a serverless computing function.

By specifying these granular actions in policy 104, customers can effectively control and manage the operations performed on their resources within provider network 100, ensuring that access is granted or denied according to their specific requirements.

Resource 110 refers to an entity within provider network 100 to which policy 104 is applied. It can represent various components such as a virtual machine instance, a data storage container, a database table, and more. Policy 104 enables customers to define permissions and access controls specific to resource 110, determining whether action 108 is allowed or denied on that resource.

In policy 104, resource 110 is identified by a resource identifier. This identifier can take the form of a uniform resource identifier (URI) or a similar format that uniquely identifies resource 110. The resource identifier may also include a wildcard character, typically represented as '*' symbol. This wildcard acts as a placeholder, allowing the policy to be applied to multiple resources that share a common pattern or attribute.

By using resource identifiers in policy 104, customers can specify the precise resources to which the policy applies, whether it is a specific resource instance or a group of resources that match a certain pattern. This flexibility allows for fine-grained access control and permissions management within provider network 100.

A policy constraint within policy 104 serves as a condition that must be satisfied for the policy to take effect. It allows for further refinement and control of access by specifying additional logical conditions that must be met.

In policy 104, a policy constraint is typically expressed as a key-value pair. The key represents a specific attribute or context of the authenticated request 112, while the value represents the specific value that the attribute must match for the policy constraint to be satisfied.

For example, a policy constraint can be utilized within policy 104 to control access based on various factors, including but not limited to: time of the request, network address from which the request originates, the requested action itself, the use of multi-factor authentication, tags (key-value pairs) associated with resource 110, and request parameters of the authenticated request 112.

By incorporating policy constraints, customers can establish additional criteria for granting or denying access to resources, allowing for more fine-grained control over the authorization process within provider network 100. This enables customers to enforce specific conditions that must be met before access is granted, providing a higher level of security and access control.

In policy 104, a policy constraint can be defined using various policy constraint keys, each representing different attributes or contextual elements of the authenticated request 112. By utilizing these policy constraint keys, customers can establish fine-grained access controls based on specific attributes or contextual information related to the request.

The inclusion of policy constraint keys, along with appropriate relational operators, allows customers to create policies in policy 104 that enforce specific conditions and restrictions on access to resource 110. Here are some examples of possible policy constraint keys:

"SourceIp": Represents the source Internet Protocol (IP) address of the authenticated request 112.
"RequestedRegion": Indicates the region within provider network 100 where the action 108 will be performed.
"UserAgent": Represents the user agent or client application making the authenticated request 112.
"CurrentTime": Provides the current time in Coordinated Universal Time (UTC).
"MultiFactorAuthPresent": Indicates whether the principal 106 making the authenticated request 112 is authenticated using multi-factor authentication.
"PrincipalType": Specifies the type of principal 106 (e.g., user, role, account, federated user, service) making the authenticated request 112.
"TagKeys": Represents the keys of a set of key-value pairs (tags) associated with resource 110.
"TagValues": Represents the values of a set of key-value pairs associated with resource 110.

By leveraging these policy constraint keys, customers can tailor their policies to consider specific attributes or contextual factors, ensuring more precise control and management of access to resources within provider network 100.

The examples provided above are just a few possibilities of policy constraints. The techniques described are not limited to those specific policy constraints and can be applied with any set of policy constraints that determine the effect of a policy within the context of an authenticated request.

Similarly, the key names used in the example policy constraints are just illustrative and can vary in actual implementations based on the specific requirements of each implementation. The choice of key names may depend on the particular system or application where the techniques are being employed.

The flexibility of the techniques allows for customization and adaptation to different scenarios and implementations, accommodating a wide range of policy constraints and variations in key names.

A policy constraint expressed in policy 104 can include a relational operator that determines how the value of the policy constraint is evaluated within the context of an authenticated request 112. The request context encompasses a set of key-value pairs that define the authentication and authorization context of the authenticated request 112. This request context includes information such as the identity of the entity (principal 106) making the request, the authentication method used for the principal, the type of principal, the requested action 108, the resource 110 on which the action is requested, and additional policy constraints that need to be satisfied, such as network address, time of the request, or multi-factor authentication.

The value specified in the policy constraint of policy 104 is compared by the authorization engine 114 to the corresponding "request" value in the request context. The authorization engine 114 establishes this correspondence based on the policy constraint key. The request context consists of a set of "request" key-value pairs or request parameters that define the request context. In some cases, a policy constraint in policy 104 may directly correspond to a request parameter, indicated by matching or similar key names between the policy constraint and the request parameter.

Various relational operators can be used to compare values in the policy constraint and the request context. Examples of such operators include StringEquals (to check if two strings are equal), StringNotEquals (to check if two strings are not equal), StringEqualsIgnoreCase (for case-insensitive string comparison), StringNotEqualsIgnoreCase (for case-insensitive inequality comparison), StringLike (to check if a string matches a specific pattern using a wildcard character '*'), StringNotLike (to check if a string does not match a specified pattern), NumericEquals (to compare two numeric values for equality), NumericNotEquals (to compare two numeric values for inequality), and other suitable relational operators.

These relational operators provide flexibility in evaluating policy constraints against request parameters, allowing for precise and customizable control over the access and authorization decisions made by the authorization engine 114.

Figure 2:
FIG. 2 presents an example policy, according to some embodiments.

FIG. 2 displays an example policy 200 represented in JSON format. Policy 200 grants permission for a write action to a resource named "MY-RESOURCE" under specific conditions. According to the policy, the write request must be made by the principal identified as the "LOGGING SERVICE" and must be performed on behalf of the customer account with the identifier "111122223333". This condition is determined by evaluating the value of the "SOURCEACCT" policy constraint key in the request context.

Figure 3:
FIG. 3 presents an example of an imprecise finding for the example policy of FIG. 2, according to some embodiments.

FIG. 3 displays an example of an imprecise finding 300 represented in JSON format for policy 200. Finding 300 correctly identifies that policy 200 allows a write action to the resource named "MY-RESOURCE" when the principal making the write request is the service "LOGGING SERVICE". However, it fails to accurately identify that the write action is allowed only when the service "LOGGING SERVICE" is making the request on behalf of the specific customer account "111122223333", as indicated by the value of the "SOURCEACCT" policy constraint key in the request context.

FIG. 4 presents an example of a precise finding 400 represented in JSON format that addresses the shortcomings of the imprecise finding 300 mentioned earlier.

Figure 5:
FIG. 5 presents an example policy, according to some embodiments.

FIG. 5 displays an example policy 500 in JSON format. Policy 500 permits a write action to a resource named "MY-RESOURCE" when the principal making the request is the service "EMAIL SERVICE" and the value of the "REFERER" condition key in the request context matches "111122223333."

Figure 6:
FIG. 6 presents an example of an imprecise finding for the example policy of FIG. 5, according to some embodiments.

FIG. 6 presents an example imprecise finding 600 in JSON format for policy 500. Finding 600 accurately recognizes that policy 500 permits a write action to a resource named "MY-RESOURCE" when the principal making the write request is the service "EMAIL SERVICE." However, it does not specify that the write is only allowed when the write request is made by the service "EMAIL SERVICE" and the value of the "REFERER" condition key in the request context is "111122223333."

Figure 7:
FIG. 7 presents an example of a precise finding for the example policy of FIG. 5, according to some embodiments.

FIG. 7 presents an example precise finding 700 in JSON format that addresses the deficiencies of the example imprecise finding 600.

Customers of provider network 100 utilize a variety of resources, including associative arrays, encryption, storage, queuing, and event-driven execution, to develop and optimize their applications. To achieve this, customers can leverage the application programming interfaces (APIs) provided by the services within provider network 100. These APIs enable customers to interact with services such as message queuing for managing queues, data storage services for storing and retrieving data, key management services for cryptographic key management, database services for working with associative arrays, and serverless execution services for running functions in a virtualized environment.

The utilization of provider network 100 resources by customers to develop applications emphasizes the crucial role of understanding and reasoning about policies that govern the access of various principals to different resources. Customers may rely on the access management service 102 to configure principals within the service. Through policies, customers can define the access permissions for authenticated requests, enabling them to selectively share certain resources with the public (public access) while restricting access to specific identities or sets of identities. It is essential to have a comprehensive understanding of these policies to ensure proper application security and access control.

The language used to express policies encompasses various features that are beneficial for customers in constructing a diverse range of applications. However, some of these features can introduce complexities when reasoning about policies. Firstly, policy constraints can incorporate regular expressions, negation, and conditions, adding flexibility but also increasing the intricacy of policy evaluation. Secondly, policy constraints can interact with each other in subtle ways, leading to uncertainties in determining the overall effect of a policy.

In some embodiments, conditional access analyzer 116 comprises a solver tool that translates policies into logical formulas and utilizes Satisfiability Modulo Theories (SMT) solvers to address policy-related inquiries, such as determining the correctness, strictness, or permissiveness of a given policy. Further information on solver tools and SMT solvers can be found in the following papers: (1) Backes, J., Bolignano, P., Cook, B., Dodge, C., Gacek, A., Luckow, K., Rungta, N., Tkachuk, O., Varming, C.: "Semantic-based automated reasoning for AWS access policies using SMT." In: 2018 Formal Methods in Computer-Aided Design (FMCAD), pp. 1-9, IEEE (2018); (2) Barrett, C., Conway, C. L., Deters, M., Hadarean, L., Jovanović, D., King, T., Reynolds, A., Tinelli, C.: "CVC4." In: International Conference on Computer-Aided Verification, pp. 171-177, Springer (2011); and (3) de Moura, L., Bjørner, N.: "Z3: An efficient SMT solver." Tools and Algorithms for the Construction and Analysis of Systems, pp. 337-340 (2008). The entire content of each of these references is hereby incorporated by reference.

Conditional access analyzer 116 can be configured to condense a policy into a concise collection of positive and declarative statements, referred to as findings, that accurately summarize the access privileges for a resource. Customers can examine these findings to determine whether the policy aligns with their intended access permissions. One of the challenges in generating findings lies in the vast number of potential authenticated requests, which encompass various combinations of usernames, account identifiers, hostnames, network addresses, and so on.

To address this challenge, conditional access analyzer 116 is designed to handle the complexity of policy summarization through a mechanism that consolidates equivalent authenticated requests into a single finding. By doing so, the analyzer can produce a set of findings that are both comprehensive (covering all potential authenticated requests that can be granted access) and concise while maintaining precision (being as specific as possible).

Conditional access analyzer 116 has the capability to answer the question "who has access?" given a policy, resulting in a set of findings. These findings fulfill the requirements necessary for analyzing security policies and providing insights into access control. Firstly, the generated findings are sound, ensuring that every access permitted by the policy is accurately represented by at least one finding. This allows customers to assess the safety of the policy by examining each finding individually and concluding whether it aligns with the principle of least privilege. Secondly, the generated findings are precise and closely aligned with the permissions granted by the policy. The techniques employed in the disclosed methods enhance the precision of the findings, minimizing false alarms. Lastly, the generated findings are concise, avoiding the need to enumerate every possible type of request with access. Such an exhaustive list would be impractical to manually inspect due to its extensive size.

As an illustration, Policy 200 shown in FIG. 2 can be succinctly summarized by the Conditional Access Analyzer 116 using the techniques described in this document. The resulting finding states that write access to "MY-RESOURCE" is allowed for an authenticated request only if both the following conditions (Condition 1 and Condition 2) are met:

(Condition 1) The principal of the authenticated request is "LOGGING SERVICE."

(Condition 2) The value of the "SOURCEACCT" policy constraint key in the authenticated request context is equal to "111122223333."

This finding is sound, as it accurately represents all authenticated requests that are granted access according to the policy. It is precise in that it precisely captures the conditions under which access is granted. Lastly, the finding provides a concise and clear summary of the policy by positively declaring who has access.

FIG. 1 illustrates a high-level process for information access control within the environment of provider network 100. The steps of the process are labeled with numbered circles overlaying arrows that represent the direction of information flow. It should be noted that the direction of the arrow represents the direction of information flow but is not necessarily the exclusive direction.

The initial step of the process involves the customer defining policy 104 within their customer account to safeguard access to resource 110. For instance, policy 104 could be represented by example policy 200 or example policy 500 shown in FIG. 2 or FIG. 5, respectively. Additionally, resource 110 may correspond to "MY-RESOURCE" as depicted in the example policies.

At step 1, the customer utilizes conditional access analyzer 116 to analyze policy 104. This can be done through various means. For example, the customer may interact with a graphical user interface (GUI) 126 by clicking on an icon, menu, button, or other visual element that triggers a command. This command is then sent over network 122, received, and processed by either access management service 102 or conditional access analyzer 116. Alternatively, the customer may choose to analyze policy 104 via a command line interface (CLI) 124. They can type a command or instructions in a text-based terminal or shell, which will be transmitted over network 122, received, and processed by access management service 102 or conditional access analyzer 116. Another option for invoking conditional access analyzer 116 is through an application programming interface (API) offered by access management service 102 or conditional access analyzer 116. The customer can use a software development kit (SDK 128) to implement a computer program or script that, upon execution, initiates a network call to the API of access management service 102 or conditional access analyzer 116.

As a result, at step 2, conditional access analyzer 116 generates finding 118. Finding 118 contains data that represents the access permissions granted by policy 104. It indicates which principals have permission to perform action 108 on resource 110 and specifies the conditions under which this access is granted.

At step 3, finding 118 is output to service 120 in provider network 100 or transmitted across intermediate network 122 for presentation or processing by command line interface 124, graphical user interface 126, or software development kit 128. CLI 124, GUI 126, or SDK 128 may be located and operated at a customer's computer system. Finding 118 can be output in various ways by access management service 102 or conditional access analyzer 116. It can be presented on a visual display, such as a monitor or screen, showing a representation of finding 118 in the form of text, images, videos, graphs, or a user interface. Alternatively, finding 118 can be sent over a network to be received and processed by other computer systems. This can be done by sending an email, transferring a file, or transmitting data to a remote server or device.

Another way to output finding 118 is by saving or storing it onto a storage media, such as a hard drive, solid-state drive, external drive, or network-attached storage. Access management service 102 or conditional access analyzer 116 can also provide an alert, notification, or status update to the user through various mechanisms. This can include using a message queue, a publish-subscription system, a pop-up message, a sound notification, a system tray icon, or a vibrating alert on a mobile device.

Finding 118 can be output in a specific data exchange format, such as comma-separated value (CSV), JavaScript Object Notation (JSON), extensible Markup Language (XML), or another structured machine-readable format. This ensures that the data is formatted in a way that can be easily processed and interpreted by other systems or applications.

Based on the output, the customer verifies that policy 104 is configured as intended and adheres to the principle of least privilege. If finding 118 indicates that policy 104 is too permissive or too restrictive, the customer can make adjustments or edits to policy 104. This leads to the repetition of steps 1, 2, and 3 in the process based on the adjusted or edited policy 104. This iterative process continues until the customer is satisfied with policy 104, ensuring that it aligns with their intended access control requirements.

Once the customer is satisfied with policy 104, it is deployed in provider network 100 to protect access to resource 110. At step 4, principal 106 initiates an authenticated request 112 to perform action 108 on resource 110. At step 5, authorization engine 114 evaluates policy 104 in relation to authenticated request 112. Based on this evaluation, at step 6, authorization engine 114 makes an authorization decision. This decision can either allow the requested action 108 on resource 110 or deny it. If authentication engine 114 determines that authenticated request 112 is allowed by policy 104, action 108 is performed on resource 110. Conversely, if the request is not allowed by policy 104, action 108 is not performed on resource 110.

Figure 12:
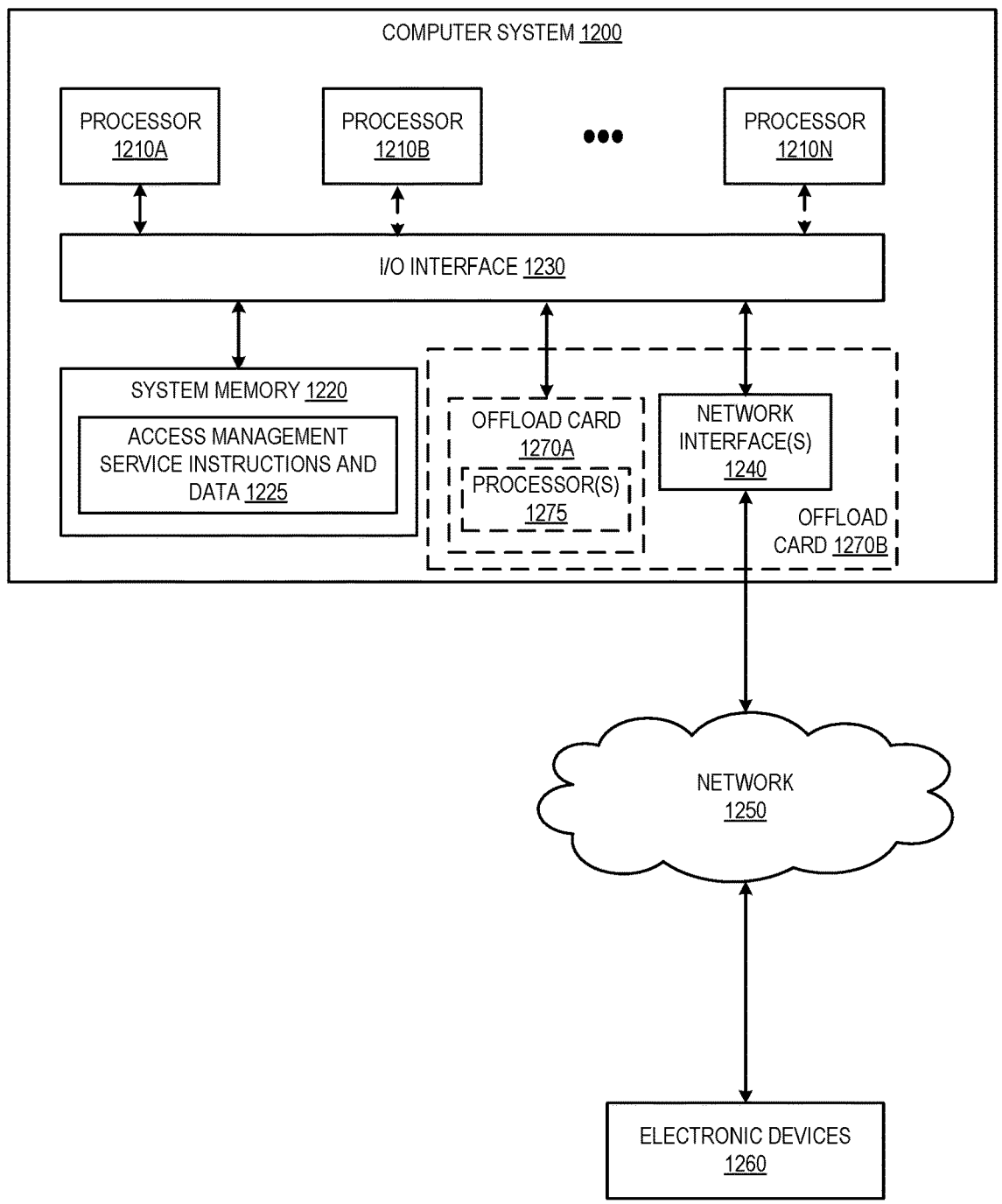
FIG. 12 is a block diagram illustrating an example computer system, according to some embodiments.

It should be noted that the process and components of provider network 100 can be performed or implemented using one or more electronic devices, such as computing systems (as illustrated in FIG. 12, described below), that facilitate the execution and management of the access control process.

One possible approach for conditional access analyzer 116 to generate findings for a policy is to enumerate all possible authenticated requests allowed by the policy. However, this approach is not practical due to the potentially vast number of possible combinations. A typical policy may consist of multiple fields, each with numerous potential values. For instance, a policy with a 12-digit account number field has $10^{12}$ possible account numbers, while a field for IPV6 addresses has $2^{128}$ possible addresses.

Enumerating all possible authenticated requests quickly becomes impractical due to the sheer volume of combinations. Even if it were feasible, the resulting number of findings would be too extensive for practical human review. Consequently, this approach would not provide much usefulness in analyzing and understanding the access control policy.

Therefore, an alternative approach is needed to address the challenges posed by the complexity and scale of policies in practice. Conditional access analyzer 116 utilizes specialized techniques to summarize and analyze policies, producing sound, precise, and compact findings that effectively capture the access permissions granted by the policy. These findings offer a practical and manageable way for customers to review and verify their policies, ensuring that access is granted according to their intentions and aligning with the principle of least privilege.

To tackle the challenge posed by the extremely large request space, conditional access analyzer 116 employs a technique called predicate abstraction. This approach involves syntactically analyzing the policy to identify the set of constants utilized by the policy to define access restrictions. Syntactic analysis encompasses processes such as tokenization, parsing, or dependency parsing of the policy, or any other suitable syntactic analysis method.

By extracting the set of constants, conditional access analyzer 116 can generate a family of predicates. These predicates, when combined through conjunctions, provide concise descriptions of partitions within the request space. This abstraction allows for a more compact representation of the potential access scenarios, enabling efficient analysis and reasoning about the policy's impact on different request contexts.

As an illustration, let's consider policy 200 from FIG. 2. From this policy, the following predicates could be derived:
P(A)="PRINCIPAL"="LOGGING SERVICE"
P(*)="PRINCIPAL"=*
S(1)="SOURCEACCT"="111122223333"
S(*)="SOURCEACCT"=*

These predicates capture specific conditions or constraints related to the principal and the source account in the policy. The notation P(A) represents a predicate for a specific principal value, P(*) denotes a predicate for any principal value, S(1) signifies a predicate for a specific source account value, and S (*) represents a predicate for any source account value. P(A) and P( ) are predicates that describe the possible values of the "PRINCIPAL" key in the request context. P(A) indicates that the value of "PRINCIPAL" equals "LOGGING SERVICE", while P(*) indicates that the "PRINCIPAL" key either does not exist in the request or exists in the request context but has a value other than "LOGGING SERVICE".

Similarly, S(1) and S (*) are predicates that describe the possible values of the "SOURCEACCT" key in the request context. S(1) signifies that the value of "SOURCEACCT" equals "111122223333", while S (*) indicates that the "SOURCEACCT" key either does not exist in the request or exists in the request context but has a value other than "111122223333".

These predicates play a crucial role in defining the conditions and constraints on the values of the "PRINCIPAL" and "SOURCEACCT" keys in the request context. This enables conditional access analyzer 116 to generate accurate findings for policy evaluation.

Conditional access analyzer 116 can compute findings for a policy by enumerating all the cubes generated by the predicates and querying an SMT solver tool. The SMT solver determines whether the policy allows access to the requests described by each cube.

Figure 8:
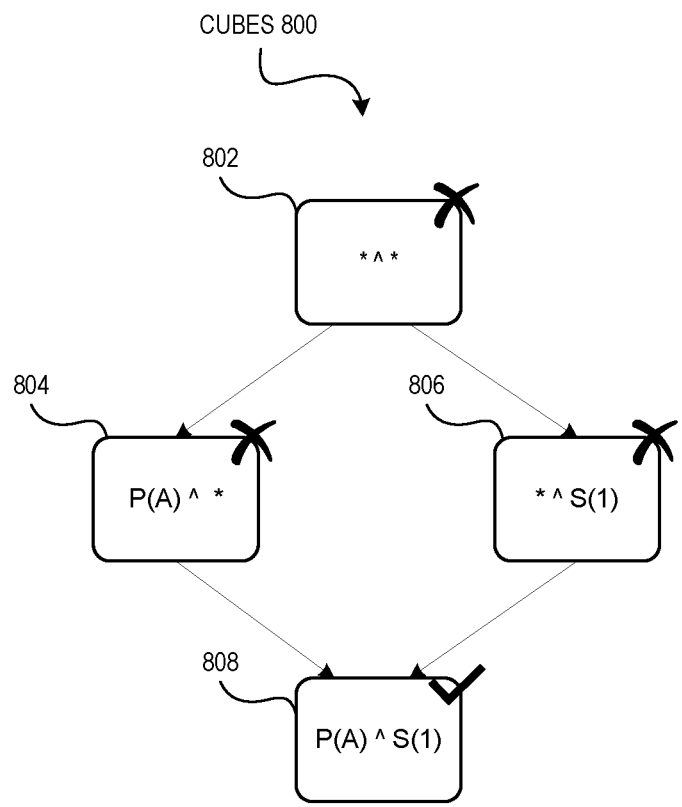
FIG. 8 presents an example of cubes of a cube-based predicate abstraction analysis applied to the example policy of FIG. 2, according to some embodiments.

For example, FIG. 8 illustrates an example set of cubes 800 that may be generated by conditional access analyzer 116 for the aforementioned predicates of policy 200 in FIG. 2. Each cube represents a combination of values for the "PRINCIPAL" and "SOURCEACCT" keys. Next to each cube is an "X" or a checkmark, indicating the result of the SMT solver query. An "X" signifies that policy 200 does not allow the requests described by the cube, while a checkmark indicates that policy 200 does allow the requests described by the cube.

From the cubes 800, it is evident that only requests where the value of the "PRINCIPAL" is "LOGGING SERVICE" and the value of "SOURCEACCT" is "11112222333" are allowed. Conditional access analyzer 116 can then translate each allowed cube into a finding. In the example of cubes 800 shown in FIG. 8, one final finding would be generated corresponding to the cube with the checkmark.

While conditional access analyzer 116 has the capability to greedily enumerate all cubes for a policy, this approach may not be efficient. In practice, policies can consist of multiple fields, potentially more than the two fields illustrated in FIG. 8. Enumerating and querying a SMT solver for each cube in this manner can become inefficient. Additionally, a greedy approach may not yield a compact set of findings, as it may split cases based on field values without considering whether such splitting is necessary.

In contrast to a greedy approach that involves enumerating and querying all cubes, conditional access analyzer 116 employs a lazy approach by generating cubes on-demand. This is achieved by maintaining a worklist of minimally refined cubes. At each step, an SMT solver is queried to determine if the cube allows an access that is not covered by any of its refinements. If such an access is found, the cube is added to the set of findings. However, if no new access is discovered, the cube is further refined field-wise by considering the values of each field individually, and the resulting cubes are added to the worklist for future exploration.

Step One: This process is illustrated through an example using FIG. 8. The worklist is initialized with (*, *), representing the cube 802 that encompasses every possible request with all potential values for the "PRINCIPAL" and "SOURCEACCT" keys in the request context. The SMT solver determines that every access allowed by cube 802 is already covered by the further direct refinements 804 and 806. Therefore, the (*, *) finding is not necessary, as denoted by the X next to cube 802 in FIG. 8. This prompts the generation of more precise findings.

Next, cube 802 is refined field-wise, resulting in the creation of two sub-cubes: 804 and 806. Sub-cube 804 is a refinement of cube 802 and represents requests where the "PRINCIPAL" is specifically "LOGGING SERVICE," while the "SOURCEACCT" can take any value. Similarly, sub-cube 806 is a refinement of cube 802 and represents requests where the "PRINCIPAL" can take any value, while the "SOURCEACCT" is fixed as "111122223333." Both sub-cubes, 804 and 806, are added to the worklist and considered in turn for further analysis.

Step Two: The SMT solver determines that every access allowed by sub-cube 804 is already covered by at least one direct refinement, which is represented by sub-cube 808. The same determination is made for sub-cube 806. Therefore, the findings (P(A)^*) and (*^S(1)) are not necessary, as denoted by the X next to each sub-cube 804 and sub-cube 806. This prompts the generation of more precise findings.

Next, cube 804 is refined field-wise by considering sub-cube 808. Sub-cube 808 is a refinement of cube 804 and represents requests where the "PRINCIPAL" is specifically "LOGGING SERVICE," and the "SOURCEACCT" is set as "111122223333." Sub-cube 808 is added to the worklist and considered in the subsequent steps. The same refinement process could be performed for cube 806; however, since sub-cube 808 has already been added to the worklist during the refinement of sub-cube 804, it does not need to be added again for the refinement of sub-cube 806.

Step Three: The SMT solver determines that sub-cube 808 allows a request that is not covered by any of its refinements since it does not have any. Consequently, sub-cube 808 is added to the set of findings as the only cube from cubes 800 that is added to the set of findings.

Condition access analyzer 116 conducts the cube-based findings analysis based on predicate abstraction specifically for trusted policy constraint keys in the context of the target policy being analyzed. Trusted policy constraint keys refer to those keys for which it is unlikely that the corresponding request values in a given request, when evaluated against the target policy by authorization engine 114, are forged, spoofed, or manipulated. Some policy constraint keys may be trusted across all policies because their corresponding values are set by access management service 102 or another trusted entity in provider network 100.

However, the level of trust associated with policy constraint keys can vary depending on the policy context. For instance, when the principal making authenticated request 112 is a service within provider network 100, a policy constraint key like "referer" may be trusted. This is because access management service 102 has confidence that the service will accurately set the value of the referer request key in the request context without any forgery, spoofing, or manipulation. On the other hand, if the principal is a user making the authenticated request 112 from a personal computing device, there is a higher risk of the referer value being forged, spoofed, or manipulated. Thus, the trustworthiness of the "referer" policy constraint key depends on the context of the policy and the type of principal involved.

The principal policy constraint, which refers to the principal identity making the request, may be considered trusted in all policy contexts. However, it is important to note that the trustworthiness of a policy constraint key can vary depending on the specific policy being evaluated and whether the corresponding request value can be manipulated, spoofed, or forged within that policy's context. When conditional access analyzer 116 analyzes a policy, if the policy is using any untrusted policy constraint keys in the context of the policy, then this can be reported by conditional access analyzer 116 in a finding. On the other hand, policy constraint keys that are trusted in the context of a policy can be included in the cube-based predicate abstraction analysis to make more precise findings. For example, in a policy where the "referer" policy constraint key is trusted in the context of the policy and used for confused deputy protection, the policy constraint key can be included in the cube-based predicate abstraction analysis to make more precise findings. Otherwise, where the "referer" policy constraint key is used in a policy context where it is not trusted (untrusted), then the condition access analyzer 116 can generate a finding that warns of the use of an untrusted policy constraint key in the policy.

More generally, when analyzing a policy, conditional access analyzer 116 has the capability to inject trusted policy constraint keys into the cube-based predicate abstraction analysis. This injection occurs if it is determined that the policy constraint key is trusted within the specific context of the policy. On the other hand, policy constraint keys that are not trusted can be omitted from the cube-based predicate abstraction analysis altogether.

To enhance performance and minimize the number of policy constraint keys analyzed, the injection of trusted policy constraint keys can be done lazily during the analysis process. This means that conditional access analyzer 116 determines whether a policy constraint key should be injected into the analysis after considering the values of other policy constraint keys within the policy. For example, the "referer" policy constraint key may be trusted in a given policy only if the value of the principal policy constraint identifies a particular service or a specific set of services. In such cases, when conditional access analyzer 116 encounters a refinement of the principal policy constraint with a value indicating that the "referer" policy constraint key is trusted in the policy context, it can lazily inject the "referer" policy constraint key into the analysis. Conversely, if the "referer" policy constraint key is not trusted in the policy context, it will not be injected into the analysis.

By employing lazy injection of trusted policy constraint keys, the cube-based predicate abstraction analysis can execute more efficiently by avoiding unnecessary analysis and focusing only on relevant policy constraints. This optimization helps improve the overall performance of the analysis process. Another benefit of conditionally injecting trusted policy constraint keys into the findings analysis conducted by condition access analyzer 116, is that more precise findings (e.g., fewer false positives) can be made for policies where a policy constraint key is trusted in the context of the policy, but not trusted in the context of other policies. With greater precision in the access control policy findings made by conditional access analyzer 116, the operator of provider network 100 may acquire new customers that appreciate the greater precision of policy findings, especially where the customers use policies to provide confused deputy protection for their resources in provider network 100, resulting in increased revenue for the operator of provider network 100. Additionally, or alternatively, the operator of provider network 100 may cause existing customers to increase their subscription footprint in provider network 100, resulting in increased revenue for the operator of provider network 100.

The following description provides a more detailed explanation of the cube-based predicate abstraction analysis algorithm with conditional injection of policy constraint keys. Before delving into the algorithm, it is helpful to clarify some key concepts and definitions. These concepts include requests, policies, predicates, and findings.

A request refers to an authenticated request made to access a resource within the context of a policy. It contains information such as the principal making the request, the action being performed, and any relevant policy constraint values associated with the request.

A policy represents a set of rules and conditions that dictate access control to resources. It consists of policy constraints that define specific criteria, such as the allowed values for certain attributes or contextual information related to the request.

Predicates are logical expressions that describe the conditions and constraints on the values of specific attributes or keys in the request context. They help determine whether a request satisfies the conditions specified in the policy.

Findings are the results generated by the cube-based predicate abstraction analysis. They summarize the access permissions granted by the policy by capturing the combinations of values that satisfy the policy's constraints.

With these concepts in mind, we can proceed to describe the cube-based predicate abstraction analysis algorithm with conditional injection of policy constraint keys in greater detail.

A request can be understood as a mapping of a set of keys (referred to as request keys) to a finite set of one or more values (known as request values) for each request key. The request values are selected from a potentially infinite set of values associated with the corresponding request key. For example, the request R can be represented as follows, where the keys "PRINCIPAL" and "SOURCEACCT" are mapped to their respective values:

R={"PRINCIPAL": "LOGGING SERVICE", "SOURCEACCT": "111122223333"}

A policy can be seen as a predicate on requests. The denotation of a policy is the set of requests that it allows.

A predicate can be seen as a mapping of request values to a Boolean or binary value. The denotation of a predicate is the set of values that satisfy the predicate. Predicates can be partially ordered, where Predicate P1 may be ordered before or the same as Predicate P2 if and only if the set of values that satisfy Predicate P1 is a subset of or the same as the set of values that satisfy Predicate P2. For example, let's consider the following three predicates:

P(1)="v is a principal in account 123"
P(2)="v is user-a in account 123"
P(2)="v is user-b in account 123"

Here, predicate P(2) is ordered before or the same as predicate P(1) because users are a type of principal. Likewise, the same applies for predicate P(3) and predicate P(1). Predicates have the property that for any given pair of predicates P-1 and P-2: P-1 is ordered before or the same as P-2, P-2 is ordered before or the same as P-1, or the set of values that satisfy P-1 and the set of values that satisfy P-2 do not overlap (i.e., the intersection of the sets is empty). This property allows a set of predicates for a given key to be tree-ordered.

A finding may be viewed as a mapping from keys to predicates. The denotation of a finding may be viewed as the set of requests where each key k is mapped to a value v in the denotation of the finding for key k. A set of findings may be viewed as the union of the findings in the set. Findings generated by conditional access analyzer 116 have the properties of being sound, precise, and compact. A set of one or more findings is sound if it covers a policy. A set of findings covers a policy if it includes all requests that are granted access according to the policy. A finding is precise if it is irreducible. A finding is irreducible if it contains some request that is excluded by all its proper refinements (or has no proper refinements). A set of findings is compact if it is minimal. A set of findings is minimal if each finding in the set is strictly contained within the set.

Figure 9:
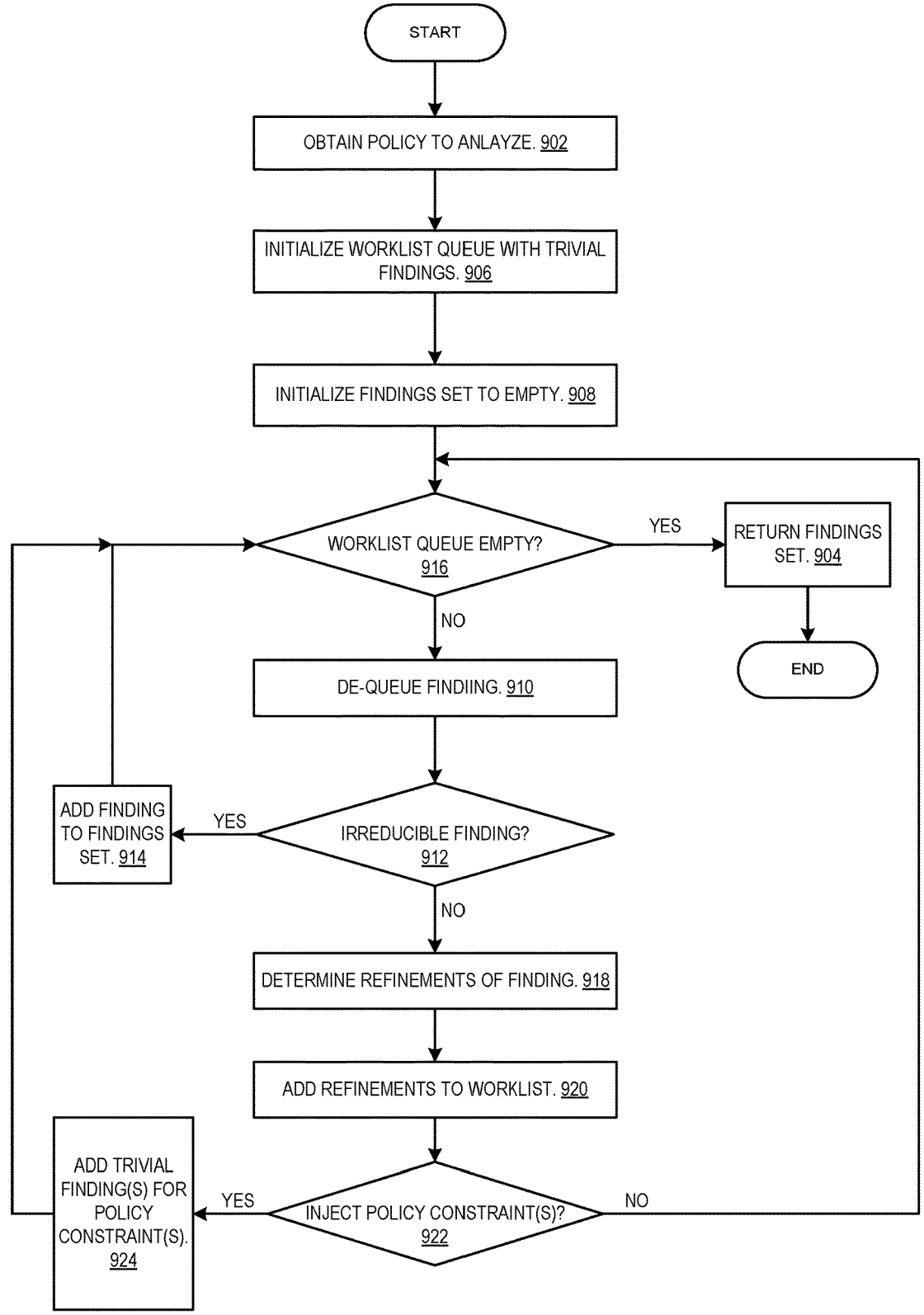
FIG. 9 is a flowchart of a method for cube-based predicate abstraction analysis with conditional injection of policy constraints, according to some embodiments.

FIG. 9 is a flowchart depicting a method for cube-based predicate abstraction analysis of a policy with conditional injection of policy constraint keys into the analysis, according to some embodiments. At a high level, the method takes 902 a policy as input and returns 904 a minimal set of irreducible findings that cover the policy as output. The method utilizes a worklist queue, which serves as a frontier of findings to be explored. The worklist queue is initialized 906 with trivial findings that map each key in an initial set of trusted policy constraint keys to the set of all possible values for the policy constraint key denoted as '*'. The method starts by initializing 908 the set of irreducible findings as an empty set and proceeds iteratively.

In each iteration, the method dequeues 910 a finding from the worklist and determines if the finding is irreducible. If the finding is indeed irreducible, it is added 914 to the set of irreducible findings, and the method continues with another iteration as long as there are more findings in the worklist (decision 916). On the other hand, if the finding is not irreducible, the method determines the refinements of the finding 918 and adds 920 them to the worklist. Subsequently, the method checks if any policy constraint keys of the policy should be injected 922 into the analysis. If there are keys to be injected, a trivial finding for each injected policy constraint key is added 924 to the worklist. If there are no keys to be injected, the method proceeds with another iteration as long as there are more findings in the worklist (decision 916).

To illustrate this, let's consider the example policy 500 depicted in FIG. 5. Policy 500 permits write access to "MY-RESOURCE" under the condition that the requesting principal is the service "EMAIL SERVICE," and the "EMAIL SERVICE" is making the write request on behalf of customer account "111122223333," as indicated by the value of the referrer request key in the request context. In this example, the "referer" policy constraint key is trusted within the context of policy 500 because the principal is a service within provider network 100, and access management service 102 can place trust in the service to appropriately set the value of the "referer" key in the request context for the write request. However, it's important to note that the "referer" policy constraint key may not be trusted in other policy contexts, such as a policy involving a user or other untrusted principals.

Let's continue with the example. At operation 902, policy 500 is obtained by either access management service 102 or conditional access analyzer 116. There are various ways in which a policy can be obtained by these services. For instance, a user can provide the policy through user input by interacting with access management service 102 or conditional access analyzer 116 using input devices like a keyboard, mouse, touchscreen, or voice command. Alternatively, a policy can be obtained through file upload, where a user uploads the policy file to access management service 102 or conditional access analyzer 116.

Another method of obtaining a policy is through network communication. Access management service 102 or conditional access analyzer 116 can receive the policy over a network using different communication protocols. This can include receiving the policy over the internet or other networks through protocols like HTTP(S), FTP, SMTP, or any other relevant network protocol.

Additionally, a policy can be obtained through an application programming interface (API) request. Access management service 102 or conditional access analyzer 116 may make an API request and receive the policy as a response, or they can receive an API request that includes the policy as part of the request payload.

Furthermore, access management service 102 or conditional access analyzer 116 can retrieve the policy from a database or a network file system where it is stored.

These are some of the ways in which a policy can be obtained, providing flexibility and accommodating different sources and methods depending on the specific needs and requirements of the access management service or conditional access analyzer.

Moving on to operation 906, conditional access analyzer 116 initializes a worklist queue. The queue is populated with a set of one or more trivial candidate findings. Each candidate finding maps a key from an initial set of trusted policy constraint keys to the set of all possible values for that specific policy constraint key. In this case, the wildcard character '*' is used to represent all possible values.

The initial set of trusted policy constraint keys can include keys like "PRINCIPAL" that are trusted for all policies. It can also include policy constraint keys that are always trusted for policy 500 specifically or for a set of policies that policy 500 belongs to. For example, the set of policies may encompass all policies that protect a resource provided by the service responsible for "MY-RESOURCE."

In the case of policy 500, it includes the "REFERER" policy constraint key. However, according to the trusted key specification accessible to conditional access analyzer 116, the "REFERER" policy constraint key is only trusted when used in an authenticated request where the principal is the "EMAIL SERVICE." Therefore, the "REFERER" policy constraint key is not initially included in the set of trusted keys for the analysis of policy 500.

After operation 906, the worklist queue contains one trivial candidate finding for the "PRINCIPAL" key. This candidate finding may be represented as ("PRINCIPAL", *) and indicates that any value for "PRINCIPAL" is a candidate for the finding.

Moving to operation 908, the set of irreducible findings for policy 500 is initialized as an empty set. This means that no irreducible findings have been generated yet in the analysis for policy 500.

In operation 916, it is determined that the worklist queue is not empty, as it still contains the candidate finding ("PRINCIPAL", *).

In operation 910, the candidate finding ("PRINCIPAL", *) is dequeued from the worklist queue.

In operation 912, a determination is made whether the candidate finding ("PRINCIPAL", *) is an irreducible finding. The candidate finding is considered irreducible if it satisfies both of the following conditions: (1) it covers a request that is not covered by any of its proper refinements, and (2) a request described by the candidate finding is allowed by policy 500 according to an SMT solver.

In this case, the proper refinements of the candidate finding ("PRINCIPAL", *) include the candidate finding ("PRINCIPAL", "EMAIL SERVICE"). It is observed that the candidate finding ("PRINCIPAL", *) covers a request that is not covered by the candidate finding ("PRINCIPAL", "EMAIL SERVICE"), such as a request where the value of "PRINCIPAL" is not "EMAIL SERVICE". Furthermore, a request described by the candidate finding ("PRINCIPAL", *) is not allowed by policy 500 since policy 500 only permits requests where the value of "PRINCIPAL" is "EMAIL SERVICE". As a result, it is determined at operation 912 that the candidate finding ("PRINCIPAL", *) is not irreducible.

In operation 918, all proper refinements of the candidate finding ("PRINCIPAL", *) are determined. This set of proper refinements includes the refinement ("PRINCIPAL", "EMAIL SERVICE") based on policy 500. At operation 920, the refinement ("PRINCIPAL", "EMAIL SERVICE") is added to the worklist queue for further exploration.

In operation 922, the method determines whether any policy constraint keys of policy 500 should be injected into the analysis. A policy constraint key should be injected into the analysis if it has not already been injected during the initialization of the worklist in operation 906, or if it has not been previously injected in the analysis of policy 500. This determination is based on the candidate findings (refinements) currently present in the worklist queue and a conditionally trusted policy constraint specification accessible to conditional access analyzer 116.

The conditionally trusted policy constraint specification contains data that specifies which policy constraint keys are trusted in specific policy contexts. For instance, it may specify that the "REFERER" policy constraint key is trusted when the "PRINCIPAL" of the policy being analyzed is "EMAIL SERVICE". Therefore, based on the presence of the candidate finding ("PRINCIPAL", "EMAIL SERVICE") in the current worklist, which satisfies the condition specified in the conditionally trusted policy constraint specification, the "REFERER" policy constraint key is injected into the analysis.

It should be noted that the injection of the "REFERER" policy constraint key into the analysis is performed lazily. This means that the policy constraint key is not injected until it is determined that the analysis will be exploring the candidate finding that satisfies the condition specified in the conditionally trusted policy constraint specification for injecting the "REFERER" policy constraint key. In the case of policy 500, the "REFERER" policy constraint key is injected after it is determined that ("PRINCIPAL", "EMAIL SERVICE") is a candidate finding.

At operation 924, since it was determined to inject the "REFERER" policy constraint key of policy 500 at operation 922, a trivial candidate finding ("REFERER", *) for the policy constraint key is added to the worklist. Whether a policy constraint key is injected into the analysis or not, the method continues with another iteration if there are more candidate findings to be explored in the worklist (decision 916).

Once all candidate findings in the worklist have been processed and the worklist queue is empty, the set of irreducible findings is returned as output. In the example policy 500, the set of irreducible findings includes ("PRINCIPAL": "EMAIL SERVICE") and ("REFERER": "111122223333").

Conditional access analyzer 116 generates findings by systematically checking the state space of trusted key values in an analyzed policy. The set of trusted keys may depend on the resource type, including policy constraint keys that are usable in policies across different services in provider network 100, as well as resource type-specific policy constraint keys used in policies to protect access to particular types of resources provided by specific services. Therefore, the set of trusted keys that are analyzed cannot be predefined for all policies or even for all policies of a specific resource type.

However, as mentioned, there are situations where policy constraint keys are trusted only in certain policy contexts, even within a particular resource type. For instance, a calling service in provider network 100 may interact with another service in the same network on behalf of a customer account, and the calling service may use specific policy constraint keys such as resource paths to enable confused deputy protection.

In some scenarios, the "REFERER" policy constraint key is typically considered untrusted because it can be easily spoofed, manipulated, or forged in many policy contexts. However, there are cases where the "REFERER" policy constraint key can be trusted. For example, when an email service in provider network 100 writes data (such as email messages) to a data storage container of a data storage service in the same network, the email service may set the value of the "REFERER" request key to the source customer account identifier when making requests to write data to the data storage container. In this situation, an appropriate policy for the data storage container would allow the "EMAIL SERVICE" principal to access the container only when the value of the "REFERER" policy constraint key matches the intended source customer account identifier.

Another example involves an audit logging service in provider network 100 that writes log data to a data storage container of the data storage service. In this case, the data storage container is referenced by a resource path in the write request, and the resource path includes an identifier of the source customer account. In such a scenario, the resource key can be trusted to ensure that the correct source customer account is associated with the log data being written.

These examples highlight the contextual nature of trust for policy constraint keys. Depending on the specific use case and policy context, certain policy constraint keys may be trusted or untrusted, even within a particular resource type.

To improve the precision of findings and reduce false positives, conditional access analyzer 116 takes into account situations where policy constraints that are typically untrusted, such as resource paths, can be considered trusted. In other words, conditional access analyzer 116 supports the concept of conditional trusted-ness in its findings analysis.

By considering the specific context and conditions under which certain policy constraints can be trusted, conditional access analyzer 116 can provide more accurate and reliable findings. This approach allows for a finer-grained analysis that takes into account the conditional trustworthiness of policy constraints, leading to improved results in terms of identifying legitimate access and minimizing false positives.

A finding tree, denoted as F, can be represented as a list of pairs (k, T), where k represents a trusted key and T represents a tree of values associated with that key. The root of the tree, T, contains the values for the trusted key k. In the findings analysis conducted by conditional access analyzer 116, the tree T is dynamically updated as the exploration of the state space of trusted key values progresses.

The initial list of pairs can be generated through an initial static analysis, which collects all the trusted values of policy constraint keys defined by the resource type of the analyzed policy. These trusted values are then organized in a tree structure based on their relative permissiveness or other relevant criteria. Additionally, the list of pairs may be modified and updated during the course of the findings analysis.

By maintaining and updating the finding tree, conditional access analyzer 116 effectively tracks the trusted key values and their associated trees, allowing for a comprehensive and adaptable analysis of the policy's state space. This approach ensures that the findings analysis is informed by the trusted values and their relationships, leading to more accurate and relevant results.

During the findings analysis, conditional access analyzer 116 systematically explores various combinations of values from the finding trees contained in the pairs. The analysis consists of two primary operations that are performed in a loop.

First, a check is conducted to determine if the finding tree corresponds to an actual finding. To make this determination, an SMT solver is employed to verify whether the values in the finding tree satisfy the conditions for granting access. If the SMT solver confirms that access is allowed, a finding is generated. At this point, the findings analysis does not delve further into the sub-finding trees since they represent less permissive findings that do not align with the principle of minimality in findings.

Second, if the finding tree does not constitute an actual finding, the findings analysis proceeds to generate all possible sub-finding trees. These sub-finding trees are derived by replacing exactly one finding tree's trusted policy constraint key with a direct subtree. In other words, the analysis generates all combinations where one of the pairs (k, T) in the finding tree is replaced by one of its sub-trees. This process is denoted as direct_subtree (F), where direct_subtree (F)=[F1, F2, . . . ], and each F1, F2, . . . represents a sub-finding tree of F.

By systematically exploring the finding trees and generating sub-finding trees as necessary, conditional access analyzer 116 ensures a comprehensive examination of the policy's constraints and conditions. This approach facilitates the identification of relevant findings while maintaining the integrity of the minimality property in the generated findings.

In the context of conditional trusted-ness, the list of pairs in a finding tree can be dynamically updated to include new pairs. This occurs when the findings analysis encounters a finding tree F during the analysis, and it becomes apparent that new trusted policy constraint keys are relevant to F. In such cases, these new trusted policy constraint keys are added to the finding tree F. This update is necessary because the newly added keys serve to further restrict access for F and all its sub-finding trees, ensuring a more accurate and comprehensive analysis.

For example, let's consider the scenario where the findings analysis focuses on the finding trees associated with the "EMAIL SERVICE" principal. During this analysis, if it is determined that the "REFERER" policy constraint key is a trusted policy constraint key for this specific principal, then the pair ("REFERER", T) representing the trusted policy constraint key can be added to the finding tree. By incorporating this new trusted policy constraint key pair into the finding tree, the analysis effectively takes into account the additional restrictions imposed by the "REFERER" policy constraint key in evaluating the findings for the "EMAIL SERVICE" principal.

More formally, the direct_subtree (F) can be updated as [F1+trusted_keys(F1), F2+trusted_keys(F2), . . . ], where the trusted_keys( ) function returns the new trusted policy constraint keys based on the current state of F. The "+" operator combines the policy constraint keys of the left and right operands. Any policy constraint keys in the right operand that are already present in the left operand can be discarded since they are redundant.

In other words, when updating the direct_subtree (F), the findings analysis considers each sub-finding tree F1, F2, etc., and appends the new trusted policy constraint keys obtained from the trusted_keys( ) function. This process ensures that the direct sub-finding trees are comprehensive and reflect the current state of trusted policy constraint keys. Duplicate or redundant policy constraint keys are eliminated to maintain the accuracy and efficiency of the analysis.

An example definition of the trusted_keys function is as follows:
01: trusted_keys(F)=
02: [(a, A)] if F contains F_spec1
03: [(b, B)] if F contains F_spec2
04: [ ] otherwise The trusted_keys( ) function mentioned above returns a list of pairs [(a, A)] if the finding tree F contains the pairs of (k, T) specified in F_spec1. Similarly, it returns the list of pairs [(b, B)] if F contains the pairs of (k, T) specified in F_spec2. If none of these conditions are met, the function returns an empty list. The conditions "if F contains F_spec1" and "if F contains F_spec2" can be defined in the conditionally trusted key specification.

As an example, let's consider two cases. In the first case, the "REFERER" policy constraint key is not trusted except when used in a policy where the "PRINCIPAL" is "EMAIL SERVICE." In the second case, the "SOURCEACCOUNT" policy constraint key is not trusted except when used in a policy where the principal is "LOGGING SERVICE."

In these cases, the trusted_keys(F) function can be defined as follows:
01: trusted_keys(F)=
02: [("REFERER", *)], if F contains ("PRINCIPAL", "EMAIL SERVICE")
03: [("SOURCEACCT", *)], if F contains ("PRINCIPAL", "LOGGING SERVICE")
04: [ ] otherwise In the above, the asterisk character ('*') is used to refer to the current root of the trusted key values. The findings analysis conducted by conditional access analyzer will explore the children of the root as part of generating direct sub-finding trees. The conditions "if F contains ('PRINCIPAL', 'EMAIL SERVICE')" and "if F contains ('PRINCIPAL', 'LOGGING SERVICE')" can be specified in the conditionally trusted key specification.

Resource path restrictions in policies can be used for confused deputy protection. To account for this, the finding tree can be extended with a new trusted policy constraint key for resource paths, ("RESOURCE", T). The tree of values, T, will depend on a syntactic analysis of the policy that finds resource paths that can be used for restricting access for the given policy type and principal. For example, a data storage container policy could contain a "RESOURCE" field with values like "/my-container/loggingservice/111122223333/" and "/my-container/loggingservice/333344445555/", which allow a logging service in provider network 100 to write log data to the resource "my-container" on behalf of either source customer account "111122223333" or source customer account "333344445555".

In this case, similar to how policy constraint keys are handled, T will have "*" at the top, and the two resource paths as immediate children. In this case, the trusted_keys (F) function could be defined as:
01: trusted_keys(F)=
02: [("REFERER", *)], if F contains ("PRINCIPAL", "EMAIL SERVICE")

03: [("SOURCEACCT", *),
  ("RESOURCE", *)], if F contains ("PRINCIPAL", "LOGGING SERVICE")
04: [ ] otherwise Conditional access analyzer 116 could also remove trusted policy constraint keys that are known not to be trusted in a given policy context. For example, a service may not set the value of a certain policy constraint key when performing a particular action on a particular type of resource. If a customer wrote a policy attempting to protect an instance of the particular type of resource using the certain policy constraint key, then if the certain policy constraint key is included in the findings analysis of the policy, then the analysis could generate a false positive finding that access to the resource instance is allowed when the certain policy constraint key is set in the request context set by the service, even though the service does not set the policy constraint key in the request context. In this case, conditional access analyzer 116 could remove the certain policy constraint key from the findings analysis to avoid a false positive finding.

FIG. 10 illustrates an example user interface 1000 presenting findings by conditional access analyzer 116, according to some embodiments. The findings are presented for policies in a particular customer account of provider network 100. In this example, the particular customer account has the identifier "222333444". The findings are presented in a table format where rows of the table correspond to different findings. The columns include a "FINDING ID" column, a "RESOURCE" column, an "EXTERNAL PRINCIPAL" column, and a "POLICY CONSTRAINT" column.

The "FINDING ID" column provides an identifier of the associated finding. The identifier may also be a hyperlink that the user can select to acquire more details about the finding. The "RESOURCE" column identifies the resource in the particular customer account to which the associated finding pertains. The "EXTERNAL PRINCIPAL" column identifies the principal or principals that are allowed access to the resource subject to the associated "POLICY CONSTRAINT" according to the associated finding.

For example, according to finding "ABC," the "LOGGING SERVICE" is allowed access to "MY-FIRST RESOURCE" subject to the policy constraint that the "LOGGING SERVICE" is requesting the access on behalf of customer account "111222333". The "POLICY CONSTRAINT" identifies the policy constraint to which access to the associated "RESOURCE" by the associated "EXTERNAL PRINCIPAL" is subject to.

Another example is finding "DEF," which indicates that the "EMAIL SERVICE" can access "MY-SECOND-RESOURCE" only when the "REFERER" in the request context equals "666777888". The "POLICY CONSTRAINT" column also indicates that the associated policy constraint provides confused deputy protection for the associated "RESOURCE". Confused deputy protection is provided in two of the three cases because a policy constraint key limits access to the associated resource to a finite set of one or more source customer accounts specified by the policy constraint key value in the associated policy.

It is important to note that these two findings are more precise than simply finding that a particular service has access to an associated resource because they also indicate the limited policy constraints under which the particular service may access the associated resource. One of the three findings indicates that a policy does not provide any confused deputy protection and, in fact, allows public access to the associated resource.

Example Provider Network

Figure 11:
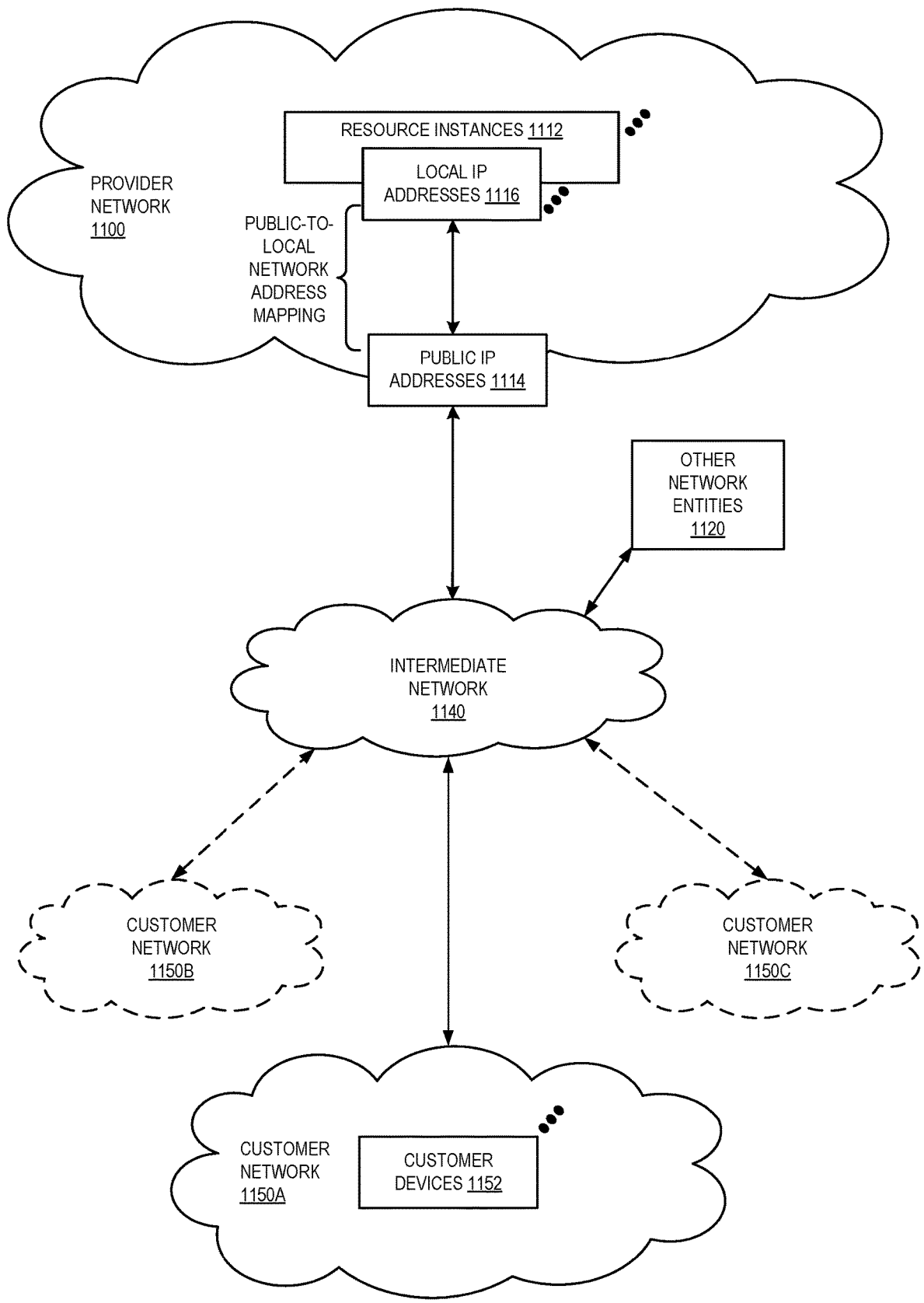
FIG. 11 illustrates an example provider network environment, according to some embodiments.

FIG. 11 illustrates example provider network 1100, according to some embodiments of the disclosure. Provider network 1100 provides resources to customers via services that allow customers to purchase, rent, or otherwise obtain instances 1112 of resources, including but not limited to computing, networking, and data storage resources, implemented on computer systems within provider network 1100 in one or more data centers. An example of a computer system is described below with respect to FIG. 12.

Local Internet Protocol (IP) addresses 1116 are associated with resource instances 1112. Local IP addresses 1116 are the internal network addresses of resource instances 1112 in provider network 1100. Provider network 1100 also uses public IP addresses 1114. Provider network 1100 allows customers (e.g., customers that operates customer networks 1150A-1150C (or "client networks") including customer devices 1152) to dynamically associate public IP addresses 1114 provisioned to the customers with resource instances 1112 provisioned to the customers. Provider network 1100 also allows the customers to remap public IP address 1114 provisioned to the customers between resource instances 1112 provisioned to the customers.

Using resource instances 1112 and public IP addresses 1114, customers can implement customer-specific applications and offer them on intermediate network 1140, such as the Internet. Other network entities 1120 on intermediate network 1140 can then generate request traffic to public IP address 1114. The request traffic is routed from other network entities 1120 through intermediate network 1140 to provider network 1100. The request traffic received at provider network 1100 is routed to local IP addresses 1116 of resource instances 1112 which process (handle) the request traffic. Response traffic generated by resource instances 1112 is routed onto intermediate network 1140 back to other network entities 1120.

Local IP addresses 1116 are internal or private network addresses of resource instances 1112. For example, local IP addresses 1116 can be within address blocks reserved by Internet Engineering Task Force (IETF) Request for Comments (RFC) 1918 or of an address format specified by IETF RFC 4193 and can be mutable within provider network 1110. Network traffic originating outside provider network 1110 is not directly routed to local IP addresses 1116. Instead, the traffic uses public IP addresses 1114 that are mapped to local IP addresses 1116. Provider network 1100 can include networking devices or appliances that provide network address translation (NAT) or similar functionality to perform the mapping between public IP addresses 1114 and local IP addresses 1116.

Provider network 1100 can provide its capabilities to customers according to one or more of a variety of different service models including Software-as-a-Service (SaaS), Platform-as-a-Service (PaaS), Infrastructure-as-a-Service (IaaS), or any other provider network service model.

With SaaS, a capability is provided to customers using software applications of provider network 1100 and running on the infrastructure of the provider network 1100. The applications may be accessible from various remote electronic devices through either a thin client interface such as a command line interface (CLI), a graphical user interface (GUI) (e.g., via a web browser or a mobile or web application), a Software Development Kit (SDK), or any other interface. The infrastructure of provider network 1100 includes the hardware resources such as server, storage, and network resources and software deployed on the hardware infrastructure that support the services being provided. Typically, under the SaaS model, customers do not manage or control the underlying infrastructure including network, servers, operating systems, storage, or individual application capabilities, except for limited customer-specific application configuration settings.

With PaaS, customers are provided the capability to deploy, onto hardware and software infrastructure of provider network 1100, customer-created or acquired applications using programming languages, libraries, services, and tools supported by provider network 1100 or other sources. Typically, under the PaaS model, customers do not manage or control the underlying hardware and software infrastructure including network, servers, operating systems, or storage, but can have control over the deployed applications and possibly configuration settings for the application-hosting environment.

With IaaS, customers are provided the capability to provision processing, storage, networks, and other fundamental computing resources where the customers can deploy and run arbitrary software, which can include operating systems and applications. The customers typically do not manage or control the underlying hardware and software infrastructure but can have control over operating systems, storage, and deployed applications and possibly limited control of selecting network components such as, for example, host firewalls.

Provider network 1100 can provide its capabilities to customers according to one or more of a variety of different deployment models including as a private cloud, as a community cloud, as a public cloud, as a hybrid cloud, or any other provider network deployment model.

In a private cloud, the hardware and software infrastructure of provider network 1100 is provisioned for exclusive use by a single organization which can comprise multiple customers. The private cloud is owned, managed, and operated by the organization, a third party, or some combination of them, and it can exist on or off premises.

In a community cloud, the hardware and software infrastructure of provider network 1100 is provisioned for exclusive use by a specific community of customers from organizations that have shared concerns such as mission security requirements, policy, and compliance considerations. The community cloud is owned, managed, and operated by one or more of the organizations in the community, a third party, or some combination of them, and it can exist on or off premises.

In a public cloud, the infrastructure is provisioned for open use by the public. The public cloud is owned, managed, and operated by a business, academic, or government organization, or some combination of them. A public cloud can exist on the premises of the public cloud provider.

In a hybrid cloud, the infrastructure is a composition of two or more distinct cloud infrastructures (private, community, public, or any other cloud infrastructure) that remain unique entities, but that are bound together by standardized or proprietary technology that enables data and application portability such as, for example, cloud bursting for load balancing between clouds.

Example Computer System

The techniques disclosed herein may be computer-implemented including being designed or implemented or configured to be executed or performed by a computer or a computer system. Computing technology, software, and algorithms may be utilized to carry out or implement the techniques. Implementation of the technique may depend at least in part on computer technology to carry out the techniques and the techniques cannot practically be performed entirely manually or without the aid of a computer.

FIG. 12 illustrates example computer system 1200, according to some embodiments of the disclosure. Computer system 1200 includes a set of one or more processors 1210A-N coupled to system memory 1220 via input/output (I/O) interface 1230. Computer system 1200 further includes network interface 1240 coupled to I/O interface 1230. While computer system 1200 can be a single computing or electronic device, computer system 1200 can encompass one computing or electronic device, or any number of computing or electronic devices configured to work together as a single computer system.

Computer system 1200 can be a uniprocessor system including one processor, or a multiprocessor system including several processors (e.g., two, four, eight, or another suitable number). A processor can be any suitable hardware processor capable of executing instructions and its functionality implemented at least in part by integrated circuitry composed of semiconductor material (e.g., silicon), but some of its functionality can be implemented by software (e.g., firmware). For example, a processor can be general-purpose or embedded microprocessor implementing an instruction set architecture (ISAs) such as x86, ARM, POWERPC, SPARC, or MIPS.

System memory 1220 stores conditional access analyzer instructions and data 1225 processable by the set of one or more processors 1210A-N. Conditional access analyzer instructions and data 1225 implement one or more desired functions, steps, or operations described herein. Conditional access analyzer instructions and data 1225 can encompass any or all of the following types of instructions that are directly or indirectly processable by the set of one or more processors 1210A-N: machine instructions such as binary code; assembly language instructions that are assembled into machine instructions by an assembler; high-level language instructions (e.g., C++, JAVA, or PYTHON instructions) that are compiled or interpreted into machine instructions by a compiler or interpreter; scripting language instructions (e.g., JAVASCRIPT) that are interpreted by a scripting engine; bytecode instructions or other intermediate instructions that are generated by a compiler from a high-level language and processed by a virtual machine; system-level instructions used in device drivers, operating system kernels, or other low-level system software; library instructions or other pre-written set of instructions that can be called by other instructions, or any other suitable type of instructions.

It should be understood that reference herein to a function or functions, a step or steps, or an operation or operations processed by a set of one or more processors (e.g., set of one or more processors 1210A-N) is intended to mean that the set of one or more processors collectively process (e.g., metaphorically as a team) the function or functions, the step or steps, or the operation or operations and not intended to necessarily require that each processor process every function, step, or operation or be capable or configured to perform every function, step, or operation. Instead, one processor may process all functions, steps, or operations or some processors may process some functions, steps, or operations while other processors process other functions, steps, or operations. Furthermore, where a function, step, or operation can be decomposed into sub-functions, sub-steps, or sub-operations, the set of one or more processors may process a function, step, or operation in a multitasking, concurrent processing, or parallel processing fashion. Finally, although not prohibited, there is no requirement that all processors be capable of or configured to process all functions, steps, or operations and some processors may be capable of or configured to process some functions, steps, or operations that other processors are not capable of or configured to process.

System memory 1220 is a non-transitory computer-readable medium such as, for example, a volatile or a non-volatile computer-readable medium. Non-limiting examples of electronic devices that encompass volatile computer-readable media include random-access memory (RAM) devices and cache memory devices. For example, system memory 1220 may be implemented at least in part by dynamic random-access memory (DRAM) devices or static random-access memory (SRAM) devices. Non-limiting examples of electronic devices that encompass non-volatile computer-readable media include read-only memory (ROM) devices, hard disk drives, solid-state drives, flash drives, magnetic tape drives, optical disk drives, and other types of memory cards. For example, system memory 1220 may be implemented at least in part by any or all of: flash memory devices, magnetic disk storage devices, optical disk storage devices, phase-change memory (PCM) devices, ferroelectric RAM (FRAM) devices, magnetoresistive RAM (MRAM) devices, resistive RAM (RRAM) devices, mask ROM devices, programmable ROM (PROM) devices, erasable programming ROM (EPROM) devices, or electrically erasable programmable ROM (EEPROM) devices. Non-transitory computer-readable media is distinct from, but may be used in conjunction with, transitory electronic signals, electromagnetic carrier waves, and other transitory signals.

I/O interface 1230 is configured to coordinate I/O traffic between the set of one or more processors 1210A-N, system memory 1220, and any peripheral devices, including network interface 1240. I/O interface 1230 performs protocol, timing, or other data transformations to convert data signals from one component (e.g., system memory 1220) into a format suitable for use by another component (e.g., processor(s) 1210). I/O interface 1230 can include support for devices attached through various types of peripheral buses such as, for example, a Peripheral Component Interconnect (PCI) bus, a QUICKPATH INTERCONNECT (QPI) bus, a UltraPath Interconnect (UPI) bus, a UNIVERSAL SERIAL BUS (USB), or other suitable bus. A function of I/O interface 1230 can be split into two or more separate components such as, for example, a north bridge and a south bridge. Some or all the functionality of I/O interface 1230 such as, for example, an interface to system memory 1220, can be incorporated directly into set of one or more processors 1210A-N.

Network interface 1240 allows data to be exchanged between computer system 1200 and electronic devices 1260 attached to network 1250. Network interface 1240 supports communication via any suitable wired or wireless data networks such as, for example, a wired or wireless Ethernet networks. Additionally or alternatively, network interface 1240 supports communication via telecommunications or telephony networks, such as analog voice networks or digital fiber communications networks, via storage area networks (SANs), such as Fibre Channel SANs, or via any other suitable type of network or protocol.

Computer system 1200 optionally includes one or more offload cards 1270A or 1270B (including one or more processors 1275 and possibly including one or more network interfaces 1240.) Offload card 1270A or 1270B is connected to I/O interface 1230. For example, computer system 1200 can act as a host for compute instances such as, for example, virtual machine instances or container instances. In this case, the set of one or more processors 1275 of offload card 1270A or 1270B can process a virtualization manager that manages compute instances that run on the set of one or more processors 1210A-N. The virtualization manager can perform compute instance management operations such as, for example, pausing or un-pausing compute instances, launching or terminating compute instances, performing memory transfer/copying operations, etc. These management operations can be performed in coordination with a hypervisor that is processed by the set of one or more processors 1210A-N. Additionally or alternatively, the virtualization manager can perform management operations in coordination with other entities executed by the set of one or more processors 1210A-N such as, for example, the compute instances themselves.

Terminology

As used herein and in the appended claims, unless otherwise clear in context, the terms "comprising," "having," "containing," "including," or other similar terms are intended to be equivalent in meaning and be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular relationship. For example, unless otherwise clear in context, a "first device" could be termed a "second device."

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment.

As used herein, unless otherwise clear in context, the term "or" is open-ended and encompasses all possible combinations, except where infeasible. For example, if it is stated that a component may include A or B, then, unless infeasible or otherwise clear in context, the component may include at least A, or at least B, or at least A and B. As a second example, if it is stated that a component may include A, B, or C then, unless infeasible or otherwise clear in context, the component may include at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical or causal connection or association between two stated things where one of the things is the basis for or informs the other without requiring or foreclosing additional unstated things that affect the logical or casual connection or association between the two stated things.

Unless the context clearly indicates otherwise, the relational term "in response to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

What is claimed is:

1. A computer-implemented method comprising:
   obtaining, at a conditional access analyzer in a provider network, an access control policy to be analyzed; wherein the access control policy comprises a principal key-value pair as a principal key and a principal key value, and a policy constraint key-value pair as a policy constraint key and a policy constraint key value;
   initiating, by the conditional access analyzer, a cube-based predicate abstraction analysis of the access control policy;
   determining, by the conditional access analyzer while performing the cube-based predicate abstraction analysis of the access control policy, that the principal key value matches a value associated with the policy constraint key in a conditionally trusted policy constraint specification;
   injecting, by the conditional access analyzer, the policy constraint key into the cube-based predicate abstraction analysis of the access control policy; and
   outputting, by the conditional access analyzer, a finding indicating that access to a resource protected by the access control policy is allowed only when both: (a) a principal value of a request matches the principal key value, and (b) the policy constraint key value matches a value of a corresponding request key of the request.

2. The computer-implemented method of claim 1, wherein the principal key value identifies a particular service in the provider network.

3. The computer-implemented method of claim 1, wherein the policy constraint key value comprises an identifier of a customer account of the provider network.

4. A computer-implemented method comprising:
   obtaining an access control policy to be analyzed; wherein the access control policy comprises a first policy constraint key-value pair as a first policy constraint key and a first policy constraint key value, and a second policy constraint key-value pair as a second policy constraint key and a second policy constraint key value;
   initiating a findings analysis of the access control policy;
   determining that the first policy constraint key value matches a value associated with the second policy constraint key in a conditionally trusted policy constraint specification;
   injecting the second policy constraint key into the findings analysis of the access control policy; and
   outputting a finding indicating that access to a resource protected by the access control policy is allowed only when both: (a) a value of a first particular request key of a request matches the first policy constraint key value, and (b) a value of a second particular request key of the request matches the second policy constraint key value.

5. The computer-implemented method of claim 4, wherein the first policy constraint key value identifies a particular service in a provider network or identified a group of a customer accounts.

6. The computer-implemented method of claim 4, wherein the second policy constraint key value comprises an identifier of a customer account of a provider network.

7. The computer-implemented method of claim 4, wherein the findings analysis of the access control policy comprises a cube-based predicate abstraction analysis.

8. The computer-implemented method of claim 4, wherein outputting the finding comprises outputting the finding to a service in a provider network, a command line interface, a graphical user interface, or a software development kit.

9. The computer-implemented method of claim 4, wherein initiating the findings analysis of the access control policy comprises:
   syntactically analyzing the access control policy to determine an initial set of one or more trusted keys; wherein the initial set of one or more trusted keys comprises the first policy constraint key but does not include the second policy constraint key.

10. The computer-implemented method of claim 4, wherein injecting the second policy constraint key into the findings analysis comprises adding a trivial candidate finding for the second policy constraint key to a worklist processed by the findings analysis.

11. The computer-implemented method of claim 4, wherein injecting the second policy constraint key into the findings analysis of the access control policy is based on:
    determining a refinement of a trivial candidate finding for the first policy constraint key;
      wherein the refinement comprises the first policy constraint key value;
    adding the refinement to a worklist processed by the findings analysis; and
    injecting the second policy constraint key into the findings analysis based on the refinement added to the worklist.

12. The computer-implemented method of claim 4, further comprising:
    presenting the finding in a graphical user interface; wherein the graphical user interface indicates that the second policy constraint key provides confused deputy protection.

13. The computer-implemented method of claim 4, wherein the access control policy is associated with a first customer account of a provider network; and wherein the second policy constraint key value comprises an identifier of a second customer account of the provider network that is not the first customer account.

14. The computer-implemented method of claim 4, wherein the value associated with the second policy constraint key in the conditionally trusted policy constraint specification comprises an identifier of a particular service in a provider network.

15. A system comprising:
    a first set of one or more computer systems to implement a first service in a provider network; and
    a second of one or more computer systems to implement an access management service in the provider network, the access management service including instructions that upon processing cause the access management service to:
    obtain an access control policy to be analyzed; wherein the access control policy comprises a first policy constraint key-value pair as a first policy constraint key and a first policy constraint key value and a second policy constraint key-value pair as a second policy constraint key and a second policy constraint key value; wherein the first policy constraint key value identifies the first service in the provider network;
    initiate a findings analysis of the access control policy;
    determine that the first policy constraint key value matches a value associated with the second policy constraint key in a trusted key specification;
    inject the second policy constraint key into the findings analysis of the access control policy; and output a finding indicating that access to a resource protected by the access control policy is allowed only when both: (a) a first policy constraint value of a request identifies the first service, and (b) a value of a particular request key of the request matches the second policy constraint key value.

16. The system of claim 15, wherein the first service is a messaging service or a logging service.

17. The system of claim 15, wherein the second policy constraint key value comprises an identifier of a customer account of the provider network.

18. The system of claim 15, wherein the first service includes instructions that upon processing cause the first service to send a request to access the resource, the request comprising the first policy constraint key and the second policy constraint key; and wherein the access management service includes instructions that upon processing cause the access management service to authorize the request to access the resource sent by the first service the resource based on the access control policy.

19. The system of claim 15, wherein the findings analysis of the access control policy comprises a cube-based predicate abstraction analysis.

20. The system of claim 15, wherein the access management service includes instructions that upon processing cause the access management service to output to a second service in the provider network, a command line interface, a graphical user interface, or a software development kit.

\* \* \* \* \*